(12) United States Patent
Cannara et al.

(10) Patent No.: US 8,943,611 B2
(45) Date of Patent: Jan. 27, 2015

(54) PROBE MODULE, METHOD FOR MAKING AND USE OF SAME

(71) Applicant: National Institute of Standards and Technology, Gaithersbrug, MD (US)

(72) Inventors: Rachel Cannara, Poolesville, MD (US); Christian Long, Greenbelt, MD (US)

(73) Assignee: National Institute of Standards and Technology, Gaithersburg, MD (US)

( * ) Notice: Subject to any disclaimer, the term of this patent is extended or adjusted under 35 U.S.C. 154(b) by 0 days.

(21) Appl. No.: 14/335,515

(22) Filed: Jul. 18, 2014

(65) Prior Publication Data

US 2014/0331368 A1  Nov. 6, 2014

Related U.S. Application Data

(60) Provisional application No. 61/857,273, filed on Jul. 23, 2013.

(51) Int. Cl.
*G01Q 70/02* (2010.01)

(52) U.S. Cl.
CPC ..................... *G01Q 70/02* (2013.01)
USPC .......................................................... 850/53

(58) Field of Classification Search
USPC ............................................. 850/52, 53, 45
See application file for complete search history.

(56) References Cited

U.S. PATENT DOCUMENTS

| | | | |
|---|---|---|---|
| 4,724,318 A | 2/1988 | Binning et al. | |
| 4,806,755 A | 2/1989 | Duerig et al. | |
| 5,260,824 A | 11/1993 | Okada et al. | |
| 5,307,693 A | 5/1994 | Griffith et al. | |
| 5,329,808 A | 7/1994 | Elings et al. | |
| 5,515,719 A | 5/1996 | Lindsay et al. | |
| 5,574,278 A | 11/1996 | Poirier et al. | |
| 5,665,253 A | 9/1997 | Kubena et al. | |
| 5,753,814 A | 5/1998 | Han et al. | |
| 5,753,911 A | 5/1998 | Yasuda et al. | |
| 6,075,585 A | 6/2000 | Minne et al. | |
| 6,134,955 A | 10/2000 | Han et al. | |
| 6,718,821 B1 | 4/2004 | Houston et al. | |
| 7,268,348 B2 * | 9/2007 | Binning et al. | 250/306 |
| 7,498,589 B2 | 3/2009 | Maruyama et al. | |
| 7,533,561 B2 | 5/2009 | Beyder et al. | |
| 7,797,757 B2 | 9/2010 | Degertekin et al. | |
| 7,958,776 B2 | 6/2011 | Wang et al. | |
| 2005/0066714 A1 | 3/2005 | Adderton et al. | |
| 2007/0012094 A1 | 1/2007 | Degertekin et al. | |
| 2007/0121477 A1 | 5/2007 | Belov et al. | |
| 2007/0180924 A1 | 8/2007 | Warren et al. | |

OTHER PUBLICATIONS

Binnig et al., "Atomic-Force Microscope," Appl. Phys. Lett. 56, 930 (1986).

Bonander et al., "Cantilever Based Optical Interfacial Force Microscope," Appl. Phys. Lett. 92, 103124 (2008).

(Continued)

*Primary Examiner* — Kiet T Nguyen

(74) *Attorney, Agent, or Firm* — Toby D. Hain

(57) ABSTRACT

A probe module includes a mount; a cantilever disposed on the mount; an electrode disposed on the mount and opposing the cantilever, and a primary fastener disposed on the mount to mechanically separate the cantilever and the electrode at a primary distance. In the probe module, the cantilever is detachably disposed on the mount, the electrode is detachably disposed on the mount, or a combination thereof.

20 Claims, 18 Drawing Sheets

(56) References Cited

OTHER PUBLICATIONS

Burns et al., "Friction and Molecular Deformation in the Tensile Regime," Phys. Rev. Lett. 82, 1181 (1999).

Goertz et al., "Mechanics of Soft Interfaces Studied With Displacement-Controlled Scanning Force Microscopy," Frog. Surf Sci. 85, 347 (2010).

Houston et al., "The Interfacial-Force Microscope," Nature 356,266 (1992).

Jarvis et al., "A New Force Controlled Atomic Force Microscope for Use in Ultrahigh Vacuum," Rev. Sci. Instrum. 67, 2281 (1996).

Jeffery et al., "Quantitative Electrostatic Force Measurement in AFM," Appl. Sutf Sci. 157, 280 (2000).

Joyce et al., "A New Force Sensor Incorporating Force Feedback Control for Interfacial Force Microscopy," Rev. Sci. Instrum. 62, 710 (1991).

Kato et al., "Force-Balancing Force Sensor With an Optical Lever," Rev. Sci.Instrum. 66, 5532 (1995).

Kato et al., "Force-Balancing Microforce Sensor With an Optical-Fiber Interferometer," Rev. Sci. Instrum. 68, 2475 (1997).

Onaran et al., "A New Atomic Force Microscope Probe With Force Sensing Integrated Readout and Active Tip," Rev. Sci. Instrum. 77, 023501 (2006).

Parlak et al., "Controlling Tip-Sample Interaction Forces During a Single Tap for Improved Topography and Mechanical Property Imaging of Soft Materials by AFM," Ultramicroscopy 109, 1121 (2009).

Rana et al., "An Electrostatically Actuated Cantilever Device Capable of Accurately Calibrating the Cantilever On-Chip for AFM-1IKE Applications," J Microelectromech. Syst. 19, 1 (2009).

Sarajlic et al., "A Novel Electrostatically Actuated AFM Probe for Vibroflexural Mode Operation," Proc. 2011 IEEE 24th Intl. Conf MEMS, 537 (2011).

Yakimov et al., "Electrostatic Force-Feedback Sensor Incorporated in an Ultrahigh VACUW11 Force Microscope," Rev. Sci. Instrum. 71, 133 (2000).

Yamamoto et al., "Precise Force Curve Detection System With a Cantilever Controlled by Magnetic Force Feedback," Rev. Sci. Instrum. 68,4132 (1997).

\* cited by examiner

PROBE MODULE, METHOD FOR MAKING AND USE OF SAME

CROSS REFERENCE TO RELATED APPLICATIONS

This application claims the benefit of U.S. Provisional Patent Application Ser. No. 61/857,273 filed Jul. 23, 2013, the disclosure of which is incorporated herein by reference in its entirety.

STATEMENT REGARDING FEDERALLY SPONSORED RESEARCH

This invention was made with United States government support from the National Institute of Standards and Technology. The government has certain rights in the invention.

BACKGROUND

Atomic force microscopy is used to probe shapes and properties of materials on a micrometer or nanometer length scale. In an atomic force microscope (AFM), a cantilever interacts with the materiel. Many AFMs use a piezoelectric member to position or actuate the cantilever. However, mechanical actuation of the cantilever leads to excitation of spurious mechanical resonances that interfere with measurement of the properties.

Accordingly, advances in hardware for surface characterization would be well-received in the art.

BRIEF DESCRIPTION

The above and other deficiencies are overcome by, in an embodiment, a probe module comprising: a mount; a cantilever disposed on the mount; an electrode disposed on the mount and opposing the cantilever, and a primary fastener disposed on the mount to mechanically separate the cantilever and the electrode at a primary distance, wherein the cantilever is detachably disposed on the mount, the electrode is detachably disposed on the mount, or a combination comprising at least one of the foregoing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments is presented herein by way of exemplification and not limitation.

It has been found that a probe module that includes a cantilever and an electrode to electrostatically displace the cantilever and that are detachably disposed on a mount provides a robust device for probing a surface of a sample. Further, the probe module is configurable to reflect a light beam in an optical diagnostic. Distance between the cantilever and the electrode is selectively tailorable such that a position of the electrode relative to the cantilever is adjustable in a plurality of dimensions. Advantageously, a force can be applied to the cantilever by an electrostatic interaction with the electrode. The force is constant or varies in time. Moreover, the cantilever mechanically responds to an electrical force rather than a mechanical force such that a mechanical resonance of the probe module or an instrument in which the probe module is disposed is not excited.

Figure 1:
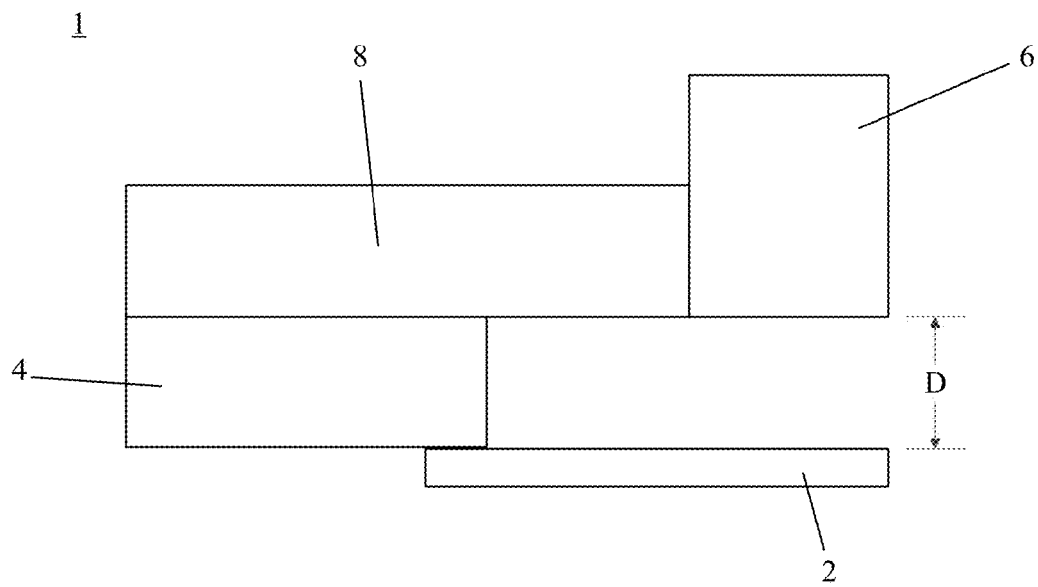
FIG. 1 shows a longitudinal cross-section of a probe module.
Figure 2:
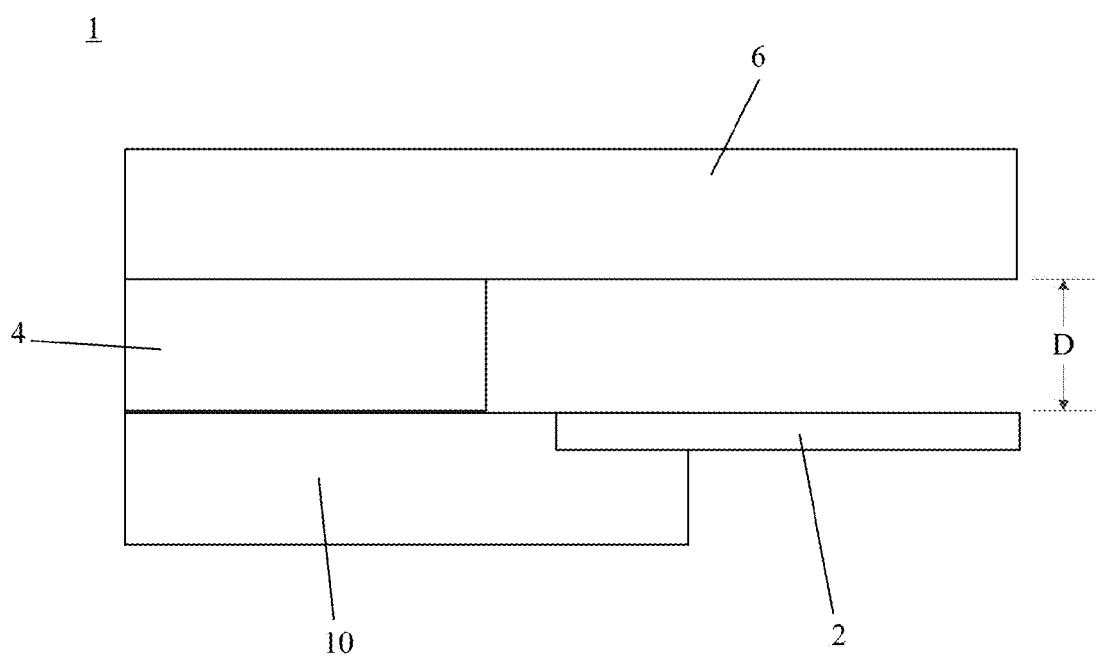
FIG. 2 shows a longitudinal cross-section of a probe module.

FIG. 1 shows a longitudinal cross-sectional view of an embodiment of probe module 1. Probe module 1 includes cantilever 2 disposed on mount 4, electrode 6 disposed on mount 4 and opposing cantilever 2, and primary fastener 8 disposed on mount 4. Primary fastener 8 mechanically separates cantilever 2 and electrode 6 at a primary distance D. According to an embodiment, cantilever 2 is detachably disposed on mount 4; electrode 6 is detachably disposed on mount 4, or a combination thereof. Here, primary fastener 8 connects electrode 6 and mount 4. In an embodiment, as shown in FIG. 2, secondary fastener 10 connects cantilever 2 and mount 4 to provide primary distance D.

Figure 3:
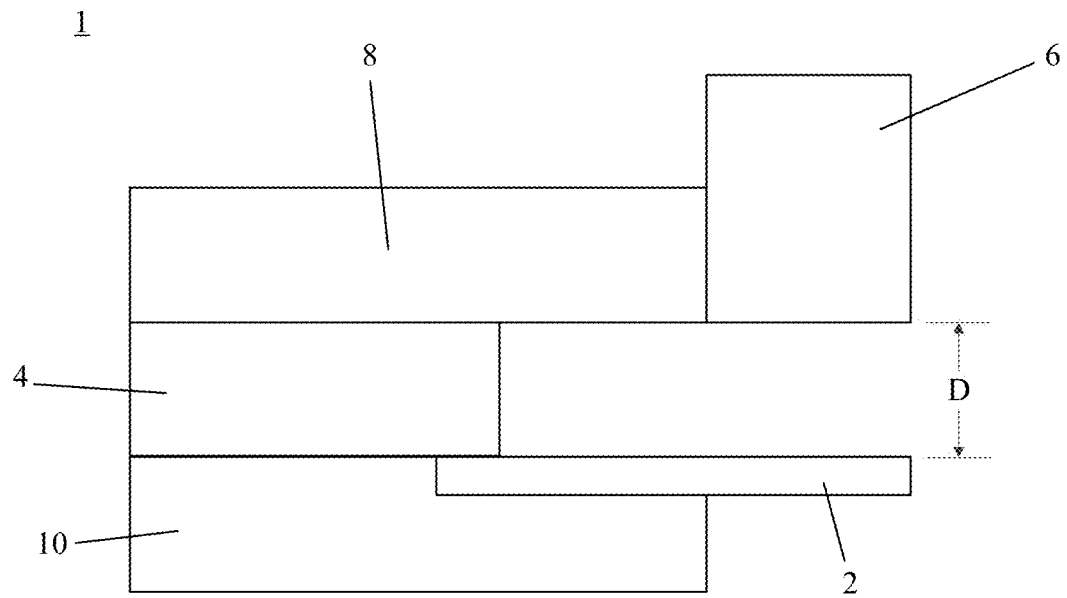
FIG. 3 shows a longitudinal cross-section of a probe module.

In an embodiment, as shown in FIG. 3, probe module 1 includes cantilever 2 disposed on mount 4, primary fastener 8 to connect electrode 6 to mount 4, and secondary fastener 10 to connect cantilever 2 to mount 4. Cantilever 2 is separated from electrode 6 at primary distance D. Cantilever 2 is detachably disposed on mount 4; electrode 6 is detachably disposed on mount 4, or a combination thereof.

Figure 4:
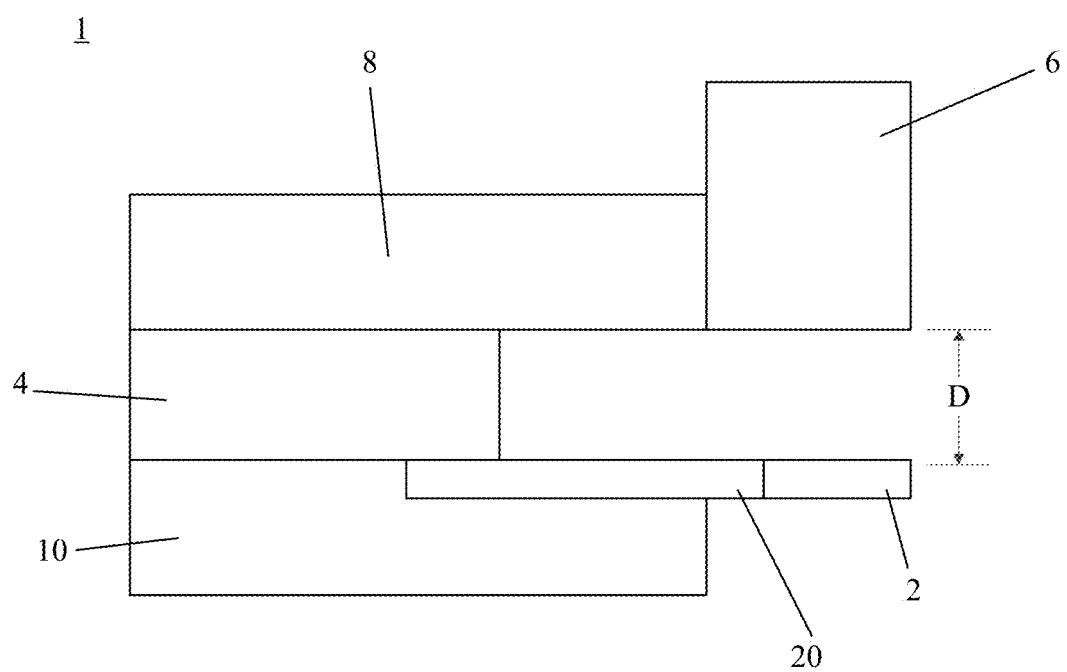
FIG. 4 shows a longitudinal cross-section of a probe module.

According to an embodiment, as shown in FIG. 4, probe module 1 further includes cantilever base 20 that is interposed between secondary fastener 10 and mount 4 such that cantilever base 20 and cantilever 2 are detachably disposed on mount 4.

Figure 5:
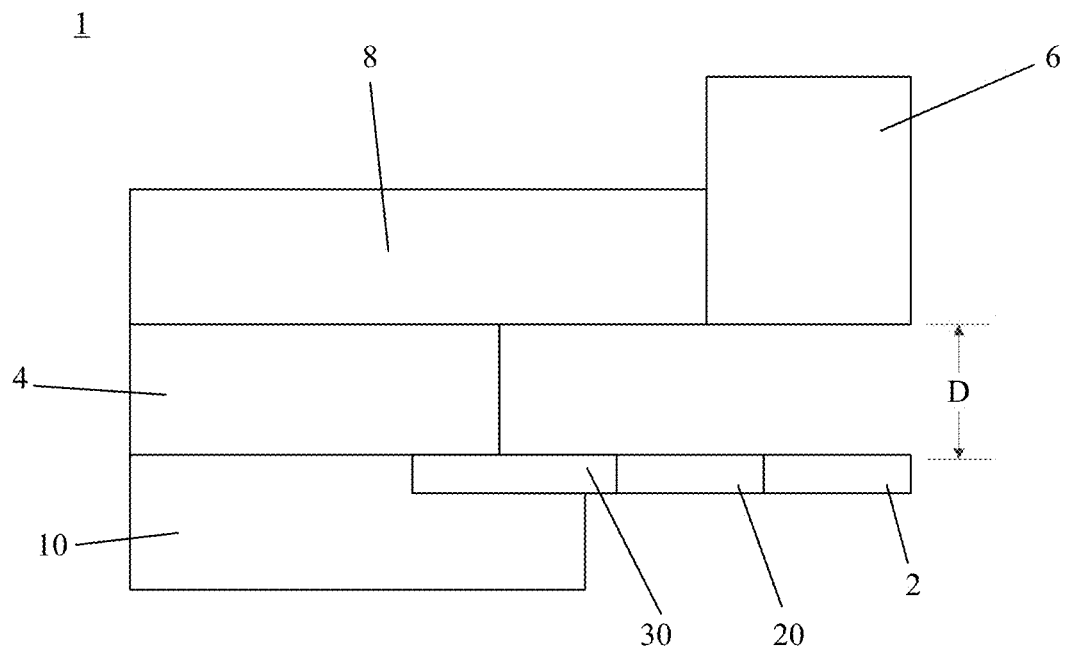
FIG. 5 shows a longitudinal cross-section of a probe module.

In another embodiment, as shown in FIG. 5, probe module 1 includes basal member 30 disposed on secondary fastener 10 or mount 4. Cantilever base 20 is disposed on basal member 30 such that secondary fastener 10 attaches basal member 30 to mount 4.

Figure 6:
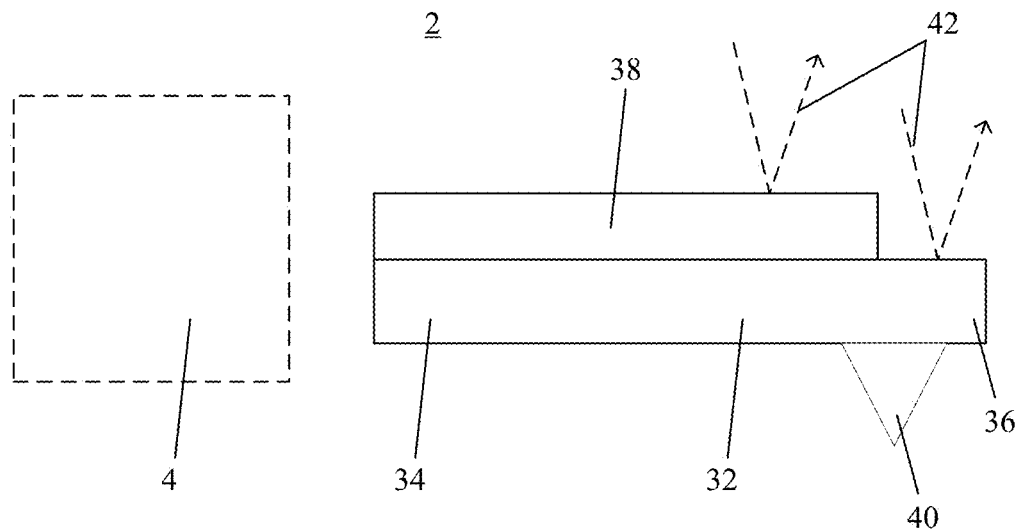
FIG. 6 shows a longitudinal cross-section of a cantilever.

In some embodiments, as shown in FIG. 6, cantilever 2 includes a substrate 32 having first end 34 proximate to mount 4 and second end 36 distal to mount 4. In certain embodiments, tip 40 is disposed on the substrate 32. In a particular embodiment, layer 38 is disposed on the substrate 32. Layer 38 can be disposed on all or a portion of a surface of substrate 32. Tip 40 can be disposed directly on substrate 32 or on layer 38. Moreover, tip 40 can be disposed on the same side of substrate 32 as layer 38 or opposing layer 38. In certain embodiments, tip 40 projects outwardly from substrate 32 in a direction parallel to a long axis of cantilever 2.

Further, layer 38 or substrate 32 can be configured to reflect light 42 (e.g., a laser beam). Light 42 can be part of a displacement diagnostic for determining a displacement of cantilever 2. As used herein, displacement of cantilever 2 (e.g., as in being displaced relative to electrode 6, a sample, or, e.g., a portion of a host instrument such as an atomic force microscope or scanning electron microscope) refers to a physical displacement (e.g., movement from a first position to a second position in space), a change in a vibrational frequency (e.g., a vibrational frequency of first end 34, second end 36, or intermediate portion of cantilever 2), a change in a vibrational phase, deformation of cantilever 2, bending of cantilever 2, flexing of cantilever 2, or a combination thereof.

Figure 7:
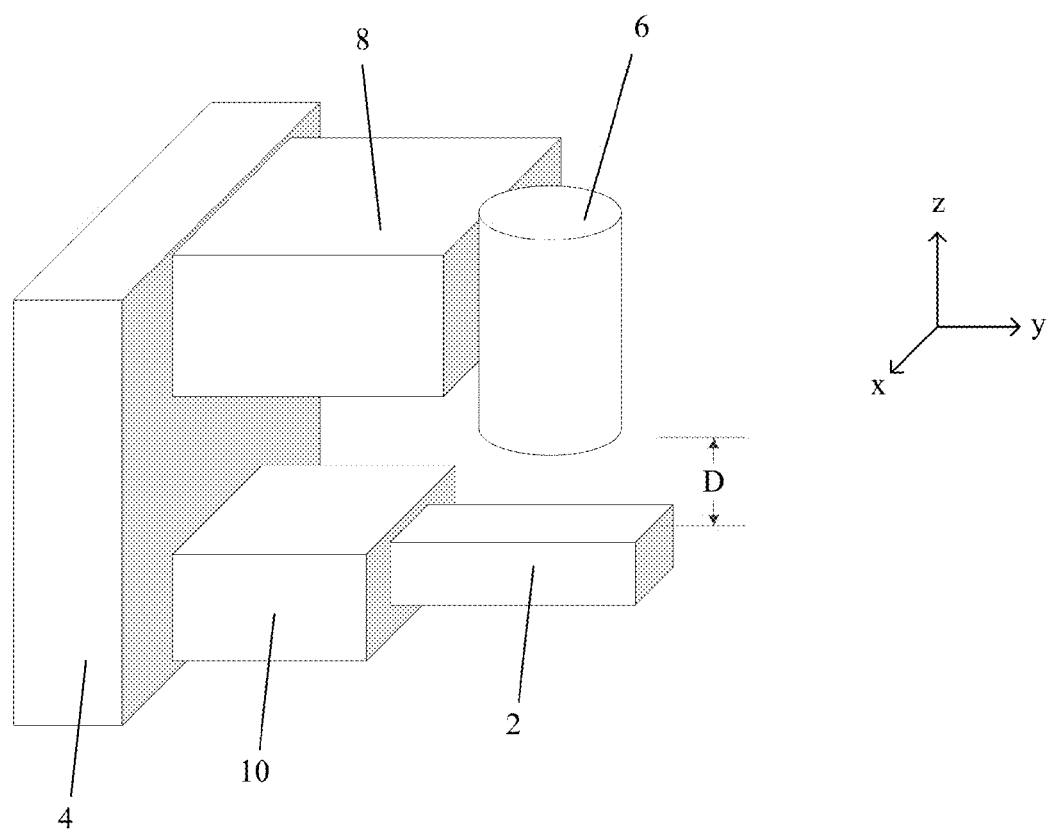
FIG. 7 shows a perspective view of a portion of a probe module.
Figure 8:
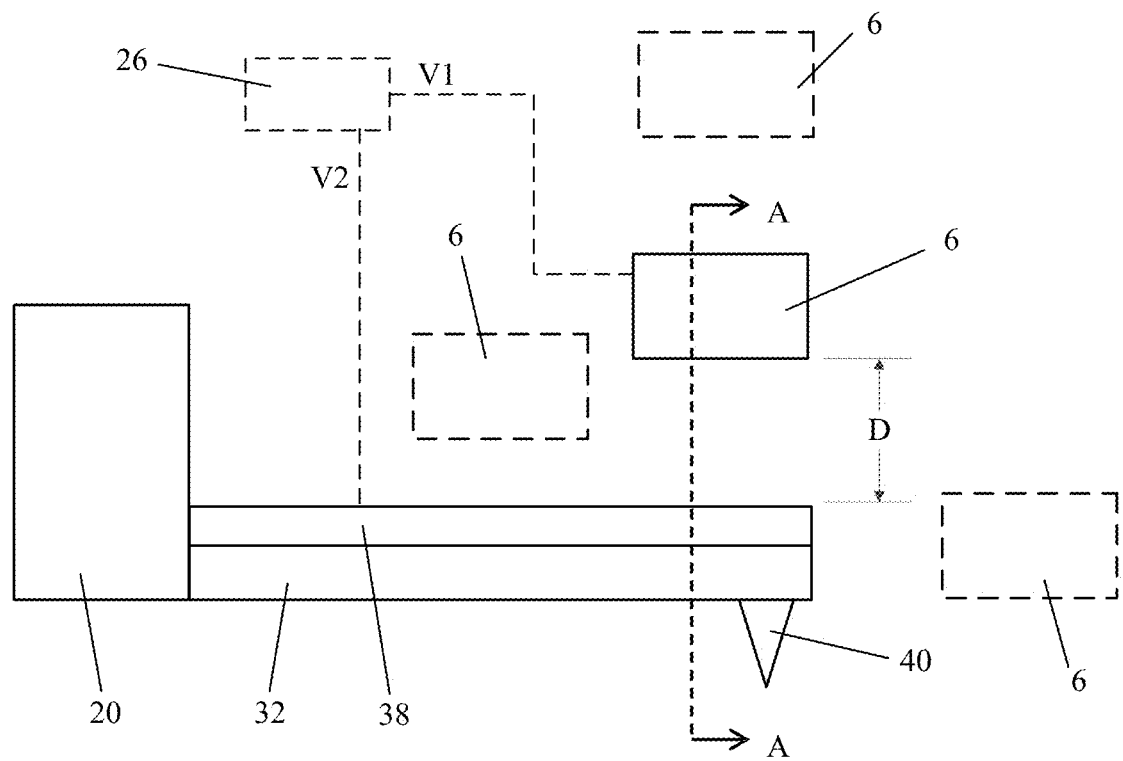
FIG. 8 shows a longitudinal cross-section of a portion of a probe module.
Figure 9:
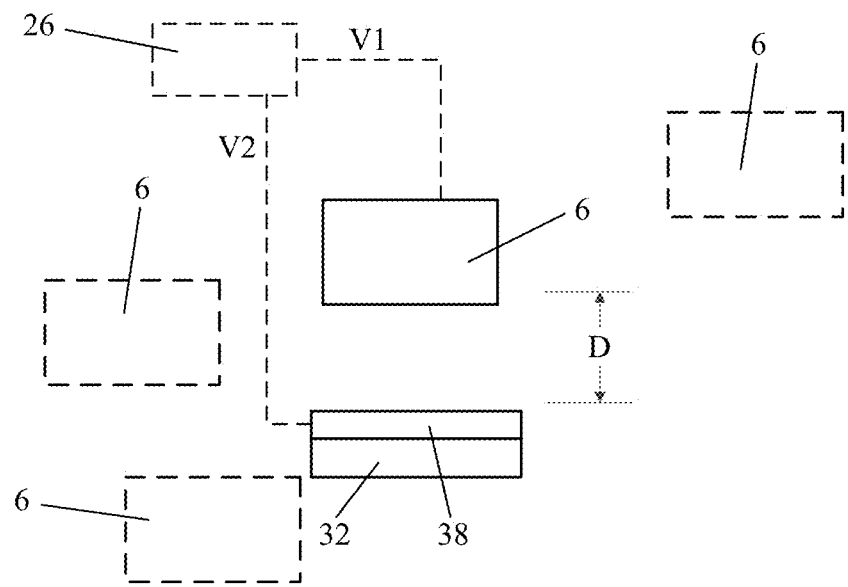
FIG. 9 shows a transverse cross-section along line A-A shown in FIG. 8.

Primary fastener 8 (e.g., as shown in FIG. 5) positions electrode 6 with respect to cantilever 2. Electrode 6 can be positioned with respect to cantilever 2 by primary fastener 8 in a coordinate (x, y, or z) as indicated in FIG. 7, which shows a perspective view of probe module 1. It is contemplated that primary distance D indicates a minimum distance between proximate surfaces of cantilever 2 and electrode 6. As such, according to an embodiment, as shown in FIG. 8 (cross-section of a portion of probe module 1 that includes electrode 6, cantilever 2, and cantilever base 20) and FIG. 9 (cross-section along line A-A of FIG. 8), a position of electrode 6 is adjustable in three dimensions with respect to cantilever 2 such that electrode 6 displayed with a dashed line indicates exemplary positions of electrode 6 relative to cantilever 2. As shown in FIGS. 8 and 9, power source 26 can be electrically connected to electrode 6 or cantilever 2 to provide first voltage V1 to electrode 6 and second voltage V2 to cantilever 2.

Figure 10:
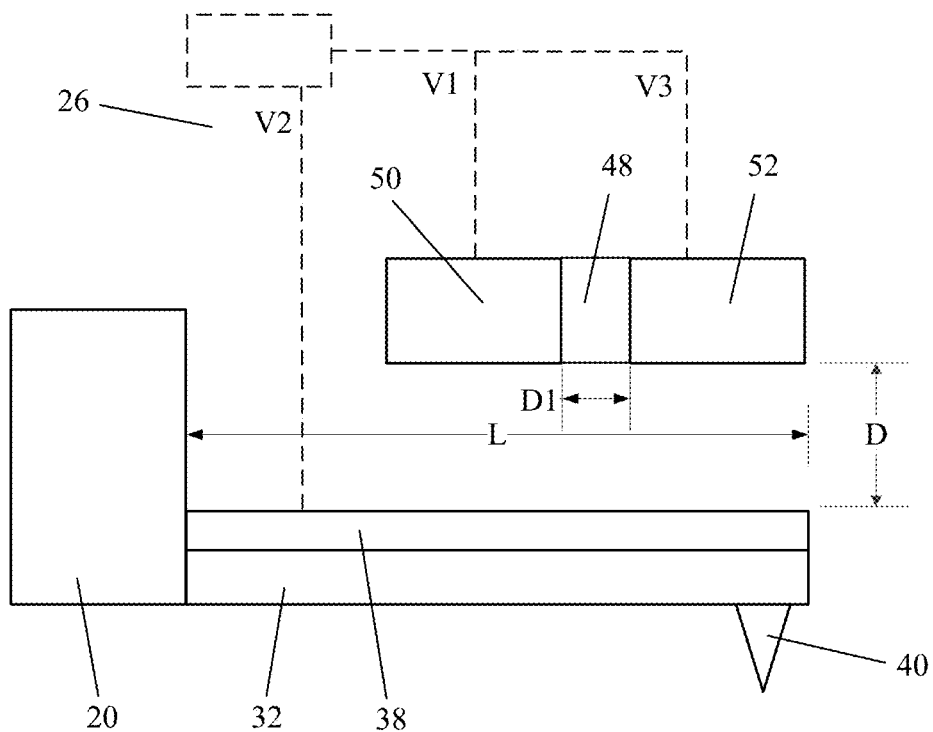
FIG. 10 shows a longitudinal cross-section of a portion of a probe module.
Figure 11:
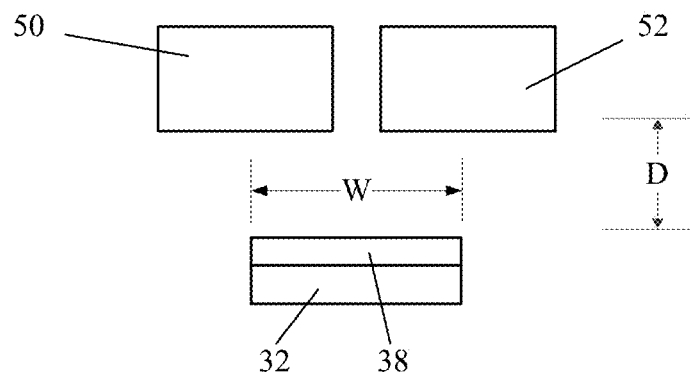
FIG. 11 shows a transverse cross-section of a portion of a probe module.
Figure 12:
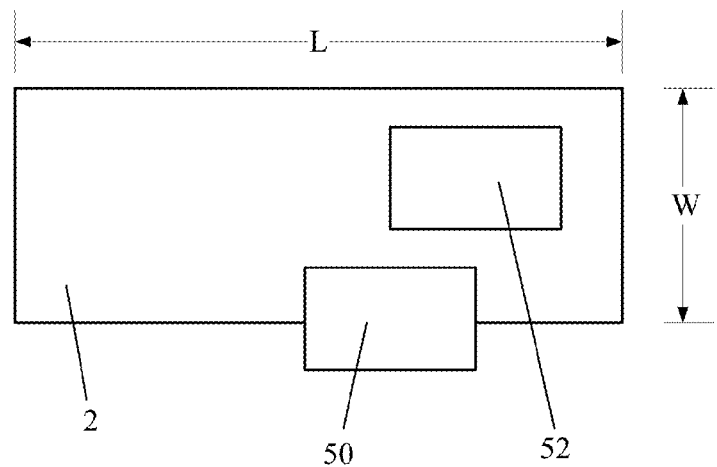
FIG. 12 shows a top view of a portion of a probe module.

According to an embodiment, electrode 6 includes a plurality of electrodes. In some embodiments, electrode 6 includes first electrode 50 and second electrode 52. In a certain embodiment, spacer 48 is interposed between first electrode 50 and second electrode 52. Spacer 48 can be a dielectric material to electrically insulate first electrode 50 from second electrode 52. It is contemplated that spacer 48 can provide thermal control (e.g., heating, cooling, maintaining a constant temperature, and the like) of electrode 6 including first electrode 50 and second electrode 52. In a particular embodiment, first electrode 50 and second electrode 52 are disposed substantially longitudinally along the length L of cantilever 2 as shown in FIG. 10 (a longitudinal cross-section of probe module 1). In a particular embodiment, first electrode 50 and second electrode 52 are disposed substantially transversely along width W of cantilever 2 as shown in FIG. 11 (a transverse cross-section of probe module 1). Although first electrode 50 and second electrode 52 are shown as being substantially aligned with respect to longitudinal direction length L or transverse direction width W of cantilever 2 in FIGS. 10 and 11, it is contemplated that first electrode 50 and second electrode 52 can be arranged to be offset from one another as shown in a top view of a portion of probe module 1 as shown in FIG. 12 for cantilever 2 and first electrode 50 and second electrode 52. Here, as shown in FIGS. 10 and 11, power source 26 can be electrically connected to first electrode 50, second electrode 52, or cantilever 2 respectively to provide first voltage V1, third voltage V3, and second voltage V2.

Figure 13:
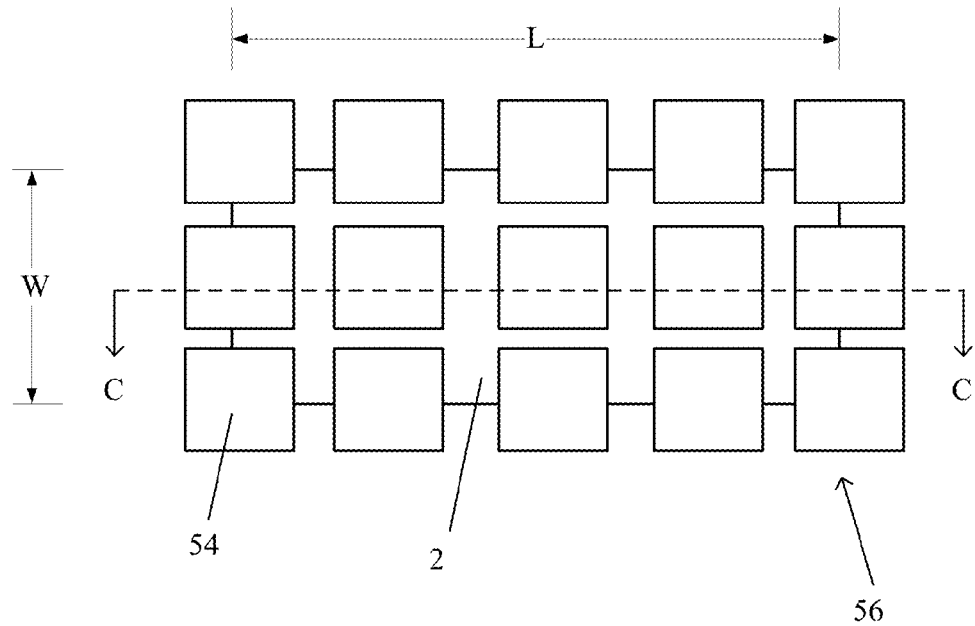
FIG. 13 shows a top view of a portion of a probe module.
Figure 14:
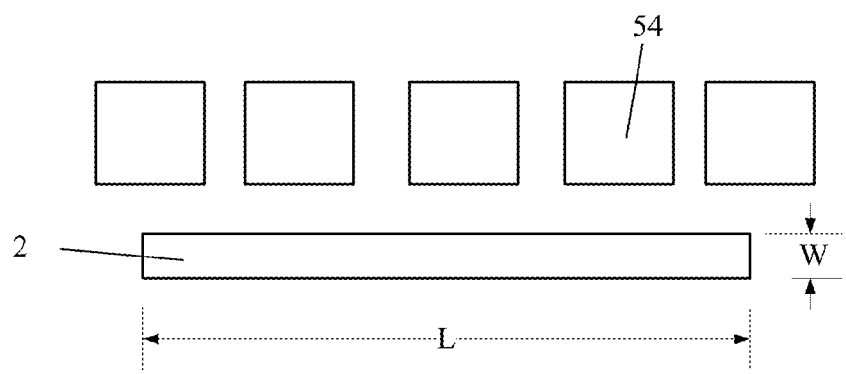
FIG. 14 shows a longitudinal cross-section of a portion of a probe module.

In some embodiments, as shown in FIG. 13 (which shows a portion of top view of probe module 1), probe module 1 has electrode 2 that includes a plurality of electrodes 54 arranged in array 56. Array 56 can be a square array (i.e., a regular array (e.g. an n×n array, an n×m array, where n and m are integers), a sparse array (e.g., where array 56 is missing an element electrode 54), an irregular array (e.g., where individual electrodes 54 are not mutually aligned), and the like). FIG. 14 shows a longitudinal cross-section along line C-C shown in FIG. 13. According to an embodiment, each electrode 54 is independently supplied a voltage or charge from, e.g., power source 26 (electrical connections not shown in FIG. 13). In some embodiments, spacer 48 is included between electrodes 54.

Figure 15:
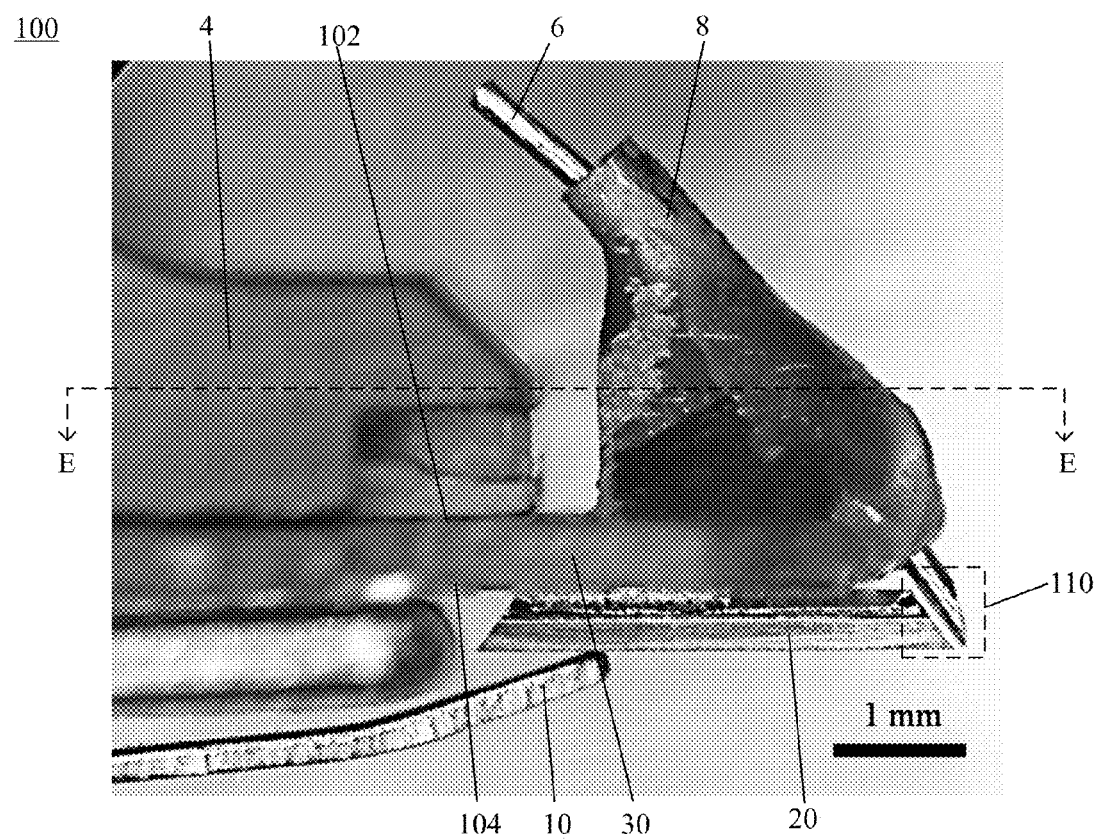
FIG. 15 shows a photograph of a probe module.

With reference to a photograph of probe module 100 shown in FIG. 15. probe module 100 includes cantilever 2 (not visible due to scale of photograph) disposed on cantilever base 20. Cantilever base 20 is interposed between secondary fastener 10 and basal member 30. Secondary fastener 10 applies a clamping force on cantilever base 20 to attach cantilever base 20 to basal member 30 so that cantilever 2 is detachably disposed on mount 4 via cantilever base 20. In certain embodiments, secondary fastener 10 is, e.g., a spring clip and the like. As such, cantilever 2 and cantilever base 20 are detached from probe module 100 (particularly, from basal member 30) by relieving the pressure applied to cantilever base 20 from secondary fastener 10. Additionally, primary fastener 8 is disposed on basal member 30. Primary faster 8 can be, e.g., a compression fitting and the like. Here, electrode 6 is disposed on primary fastener 8. Primary fastener 8 is configured to maintain a primary distance D between electrode 6 and cantilever 2. In a certain embodiment, primary fastener 8 provides a press fit, friction mount, or a combination thereof for electrode 6. Basal member 30 can be electrically insulating but can be configured to include a plurality of electrical contacts such as a first electrical contact (not shown) and a second electrical contact (not shown), e.g., at a first surface 102 that opposes a second surface 104. First electrical contact and second electrical contact provide an electrical connection respectively for electrode 6 (via primary fastener 8) and cantilever 2 (via cantilever base 20). First electrical contact and second electrical contact are in electrical communication with power source 26 (not shown). In an embodiment, electrical power can be supplied to electrical contact pad 106 that is disposed on mount 4. Electrical contact pad 106 is in electrical communication with cantilever 2 via second electrical contact of basal member 30.

Figure 16:
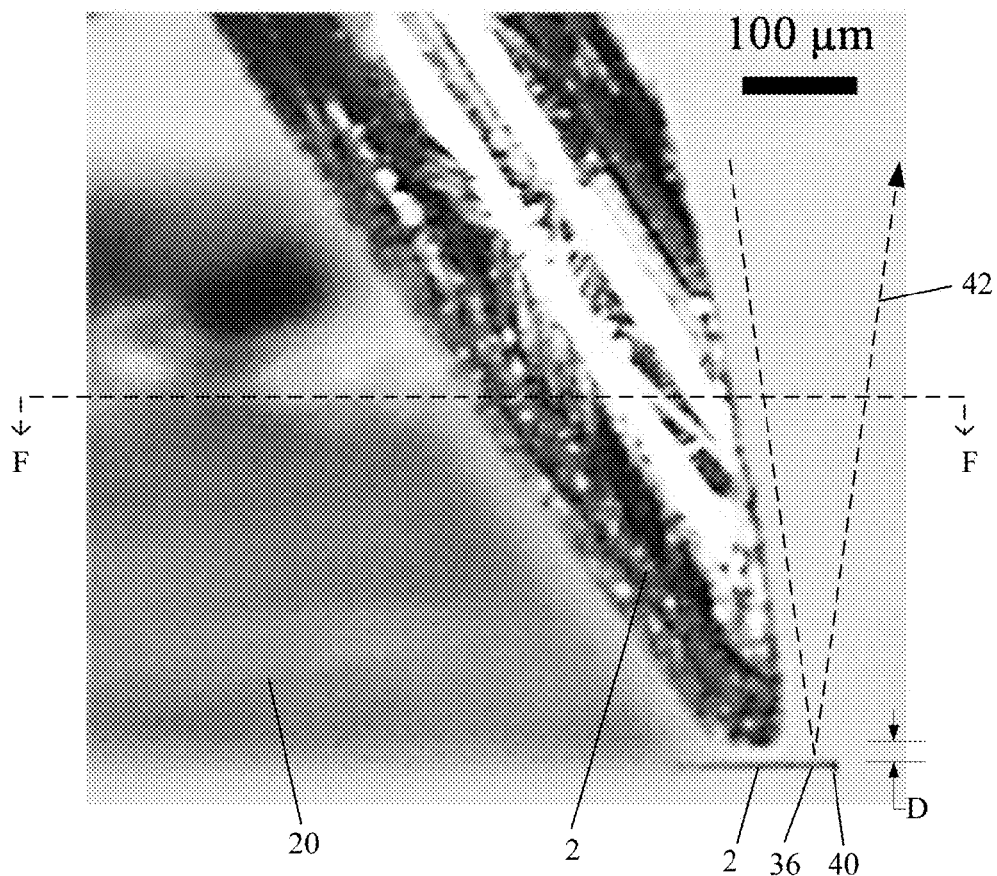
FIG. 16 shows a photograph of an enlarged portion of the probe module in FIG. 15.

FIG. 16 shows a magnified portion 110 from FIG. 15. Here, cantilever 2 is separated from electrode 6 by primary distance D. Tip 40 is disposed at second end 36 of cantilever 2. A shape of electrode 6 provides optical clearance for light 42 (e.g., laser beam, focused light, and the like) to be communicated to the reflected from cantilever 2.

Figure 17:
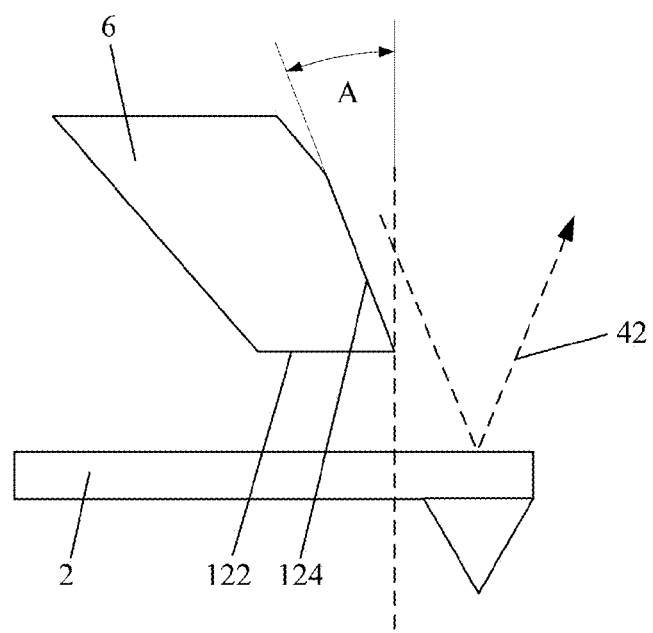
FIG. 17 shows a longitudinal cross-section of a portion of a probe module.

FIG. 17 shows a notional line drawing corresponding to a cross-section along line F-F shown in FIG. 16. Electrode 6 includes primary surface 122 disposed proximate to cantilever 2 and secondary surface 124 disposed proximate to light 42. According to an embodiment, secondary service 124 is arranged at an angle A with respect to normal N of cantilever 2.

Figure 18:
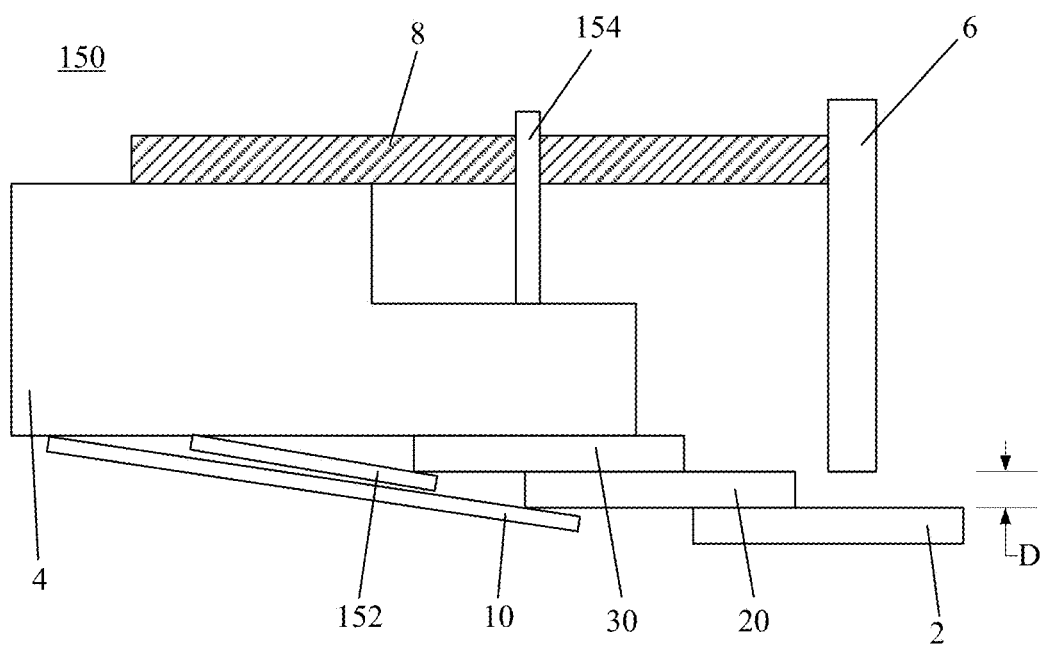
FIG. 18 shows a longitudinal cross-section of a probe module.

In an embodiment, as shown in a cross-sectional view of probe module 150 of FIG. 18, probe module 150 includes cantilever 2 disposed on cantilever base 20. Secondary fastener 10 provides a mounting force (e.g. a clamping force and the like) of cantilever base 20 to mount 4. Cantilever base 20 is disposed on basal member 30 that is disposed on mount 4. Tertiary fastener 152 supplies a clamping force of basal member 30 to mount 4. Cantilever 2 opposes electrode 6 that is disposed on primary fastener 8. Primary fastener 8 is disposed on mount 4, and displacement member 154 is connected to primary fastener 8 to provide and maintain mechanical adjustability of primary distance D between electrode 6 and cantilever 2. Primary fastener 8, secondary fastener 10, and tertiary fastener 152 are attached to mount 4 by a suitable means for attachment such as a fastener, e.g., a screw, an adhesive, and the like. Displacement member 154 can be, e.g., a dowel, a screw, and the like. Here, electrode 6 is detachable from mount 4 by detaching primary fastener 8 from mount 4. Cantilever 2 is detachable from mount 4 by relieving the clamping force provided by secondary fastener 10.

Primary fastener 8, secondary fastener 10, or tertiary fastener 152 can be a material that flexes yet provides ample clamping force and material strength so that electrode 6, cantilever 2, and basal member 30 do not move from their intended position. It should be appreciated that cantilever 2 supports a plurality of eigenmodes such as a flexural mode a torsional mode or combination thereof such that although secondary fastener 10 does not allow movement of cantilever 2 from its position, secondary fastener 10 does not interfere with a motion of cantilever 2 due to presence of such an eigenmode.

Figure 19:
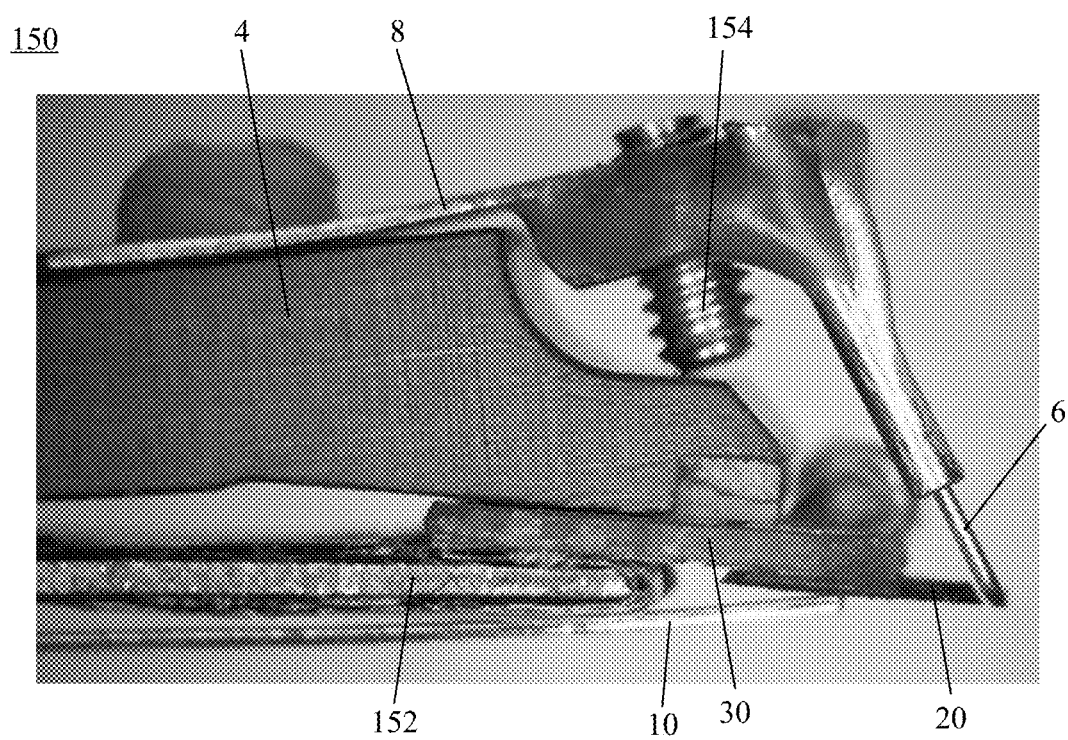
FIG. 19 shows a photograph of a probe module.
Figure 20:
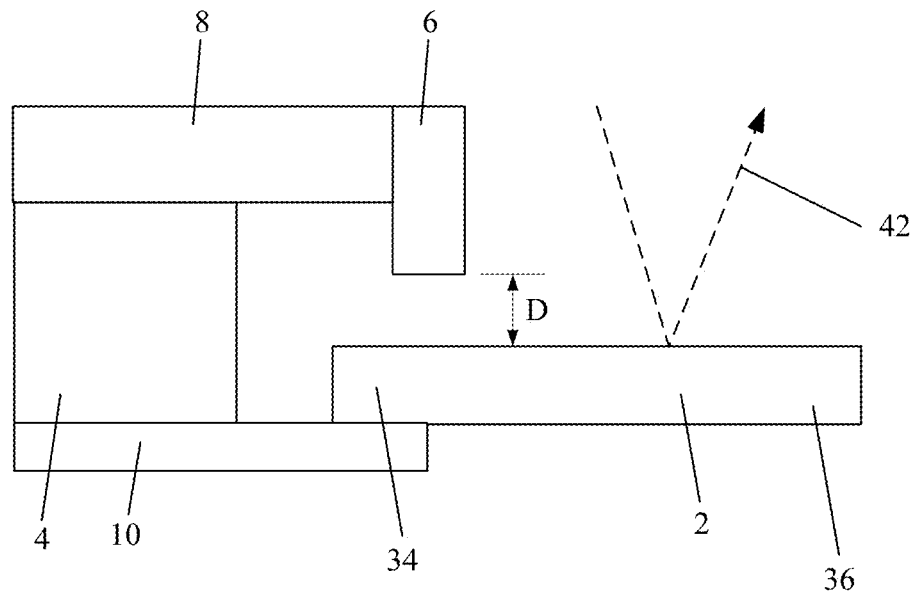
FIG. 20 shows a longitudinal cross-section of a probe module.

According to an embodiment, as shown in a photograph of probe module 160 in FIG. 19, probe module 160 includes cantilever 2 (too small to be seen at this magnification) disposed on cantilever base 20. Secondary fastener 10 provides a mounting force (e.g., a clamping force and the like) of cantilever base 2 to mount 4. Cantilever-based 20 is disposed on basal member 30 that is disposed on mount 4. Tertiary fastener 152 supplies a clamping force of basal member 30 to mount 4. Cantilever 2 opposes electrode 6 that is disposed on primary fastener 8. Primary fastener 8 is disposed on mount 4, and displacement member 154 is connected to primary fastener 8 to provide and maintain mechanical adjustability of primary distance D between electrode 6 and cantilever 2. Primary fastener 8, secondary fastener 10, and tertiary fastener 152 are attached to mount 4 by a suitable means for attachment such as a fastener, e.g., a screw, an adhesive, and the like. Displacement member 154 can be, e.g., a dowel, a screw, and the like. Here, electrode 6 is detachable from mount 4 by detaching primary fastener 8 from mount 4. Cantilever 2 is detachable from mount 4 by relieving the clamping force provided by secondary fastener 10.

Figure 21:
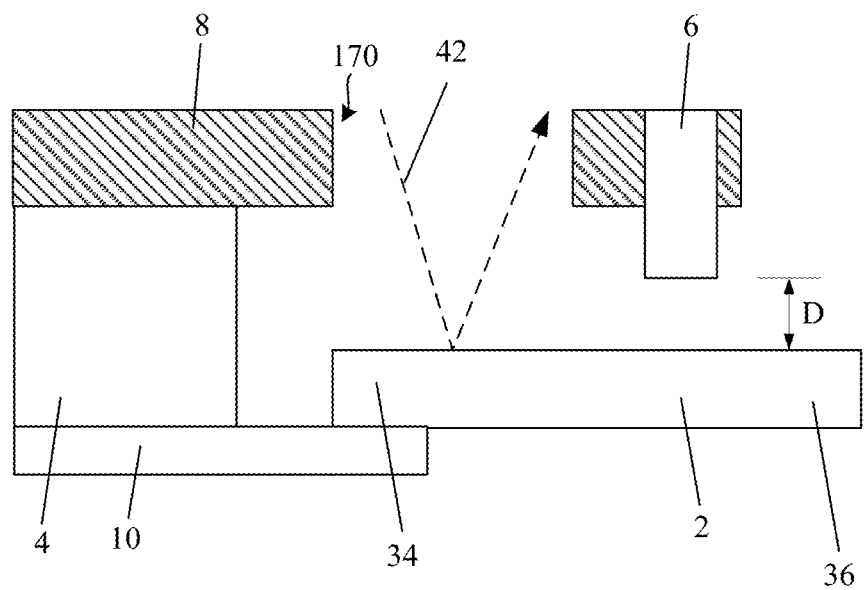
FIG. 21 shows a longitudinal cross-section of a probe module.

It is contemplated that in certain embodiments probe module is configured to reflect light 42. Light 42 can impinge various locations of, e.g., cantilever 2 such that a displacement of cantilever 2 is determined. With reference to FIG. 21, which shows a cross-section of probe module 162, in an embodiment, probe module 162 includes cantilever 2 disposed on secondary fastener 10 and electrode 6 disposed on primary fastener 8, which is disposed on mount 4. Light 42, e.g., from an external source (not shown) such as a laser, light emitting diode, a lamp, a bulb, and the like, impinges on second end 36 such that electrode 6 is interposed between light 42 and mount 4. Such a configuration is applicable for use, e.g., in an atomic force microscope that incorporates an optical diagnostic to determine displacement of cantilever 2.

Figure 22:
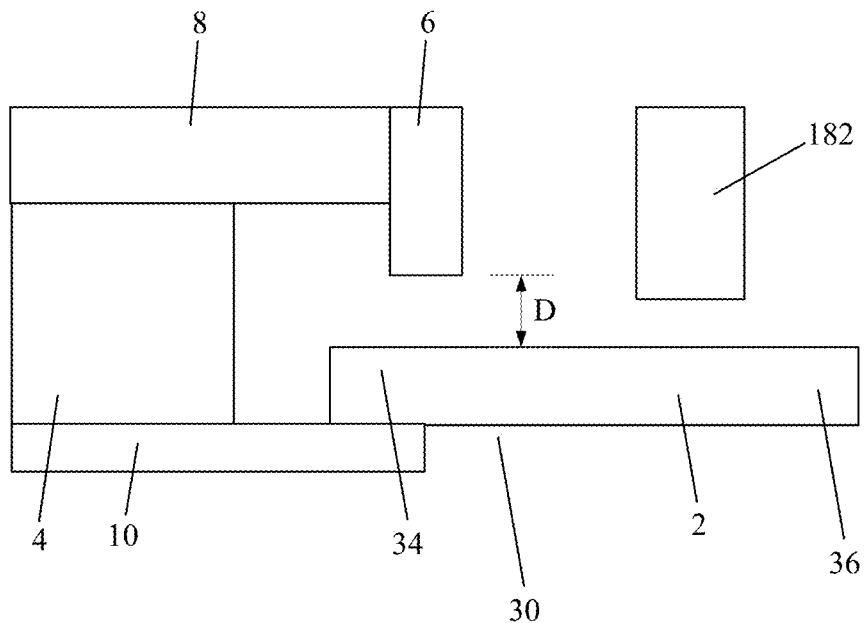
FIG. 22 shows a longitudinal cross-section of a probe module.
Figure 23:
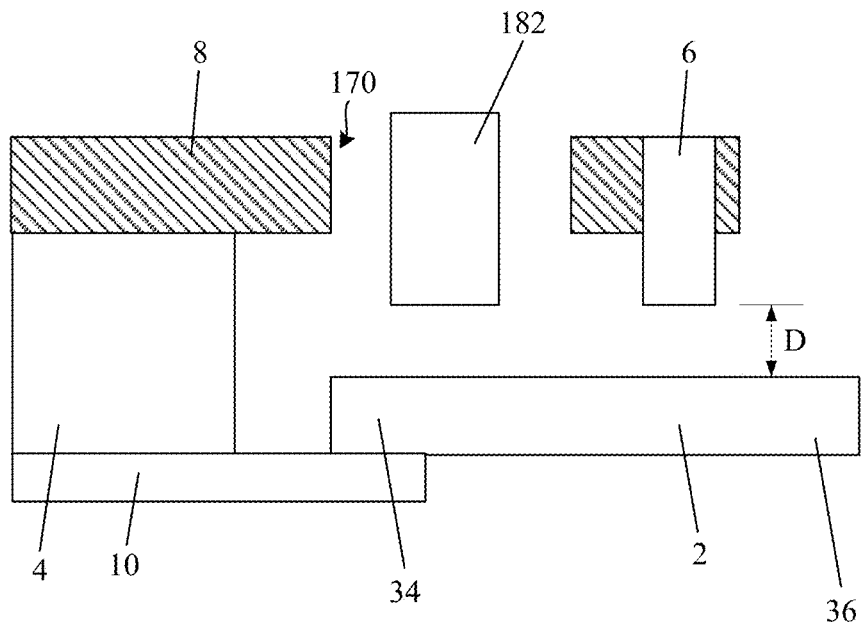
FIG. 23 shows a longitudinal cross-section of a probe module.

With reference to FIGS. 22 and 23, which show cross-sections of probe module 180, in an embodiment, probe module 162 includes cantilever 2 disposed on secondary fastener 10 and electrode 6 disposed on primary fastener 8, which is disposed on mount 4. Displacement sensor 182 is disposed proximate to second end 34 (as in FIG. 22) such that electrode 6 is interposed between mount 4 and displacement sensor 182. In some embodiments, as shown in FIG. 23, displacement sensor 182 is interposed between electrode 6 and mount 4. Displacement sensor 182 is configured to measure a displacement from primary distance D between electrode 6 and cantilever 2. Exemplary displacement sensors include a capacitance sensor, an interferometric sensor, an optical sensor, piezoelectric sensor (e.g., a piezoelectric interposed between layers that are disposed on the substrate of the cantilever), and the like.

Without wishing to be bound by theory, it is believed that disposing electrode 6 proximate to second end 36 and distal to first end 34 results in increased displacement per unit of electrostatic force of cantilever 2 since a stiffness of cantilever 2 is inversely proportional to a length cubed of cantilever 2. Further, it is believed that disposing light 42 or displacement sensor 182 proximate to second end 36 and distal to first end 34 of cantilever 2 increases measurement resolution or sensitivity of a displacement of the cantilever 2 with respect to primary distance D.

As discussed above, an embodiment of the cantilever includes the substrate and optional coating disposed thereon. According to an embodiment, the cantilever includes a dielectric material. In some embodiments, the cantilever includes an electrically conductive material. The cantilever generally is made using nanofabrication or microfabrication processing technology and can include layer formation, e.g., on a silicon on insulator (SOI) material. The substrate can include an element from the periodic table (e.g., group 11, 12, 13, 14, 15, 16, and the like) as well as a dopant (e.g., an alkali metal, alkaline earth metal, transition metal, rare earth metal, and the like) and other species. Exemplary elements for the substrate include Si, Ge, As, Al, In, P, C, S, O, Ga, N, and the like. A dopant can be in a concentration from 0 weight percentage (wt %) to 0.5 wt %, specifically from 0 wt % to 0.1 wt %, and more specifically from 0 wt % to 0.01 wt %.

In a particular embodiment, the substrate of the cantilever includes a semiconductor. An exemplary semiconductor is an element from group 11, 12, 13, 14, 15, or 16 (IUPAC nomenclature, which respectively is identical to group I, II, III, IV, V, or VI) of the periodic table such as a Si, Ga, Ge, As, In, Sn, Sb, Te, At, Hf, Zn, and the like, or a combination thereof. According to an embodiment, the substrate is a compound semiconductor such as SiC, SiGe, GaN; a group 13-15 (also referred to as a group III-V) semiconductor such as AlSb, AlAs, Aln, AlP, BN, GaSb, GaAs, GaN, GaP, InSb, InAs, InN, InP, and the like; a group 12-16 (group II-VI) semiconductor such as CdSe, CdS, CdTe, ZnO, ZnSe, ZnS, ZnTe, and the like; a group 11-17 (group I-VII) semiconductor such as CuCl and the like; a group 14-16 (group IV-VI) semiconductor such as PbS, PbTe SnS, and the like; a group 16 containing semiconductor such as PbTe, $MoS_2$, GaSe, and the like; an oxide semiconductor such as CuO, $Cu_2O$, and the like; (Al,Ga)N, (Al,Ga)As, (In,Ga)As, (Al,Ga)Sb, (In,Ga)Sb, as well as nitride, arsenide, antimonide quaternary III-V alloys, or a combination comprising at least one of the foregoing. Examples of II-VI alloys include, but are not limited to CdSe, CdTe, CdS, ZnSe, and combinations thereof. Examples of Group III-V ternary alloys include, but are not limited to, (Ga,Al)As, (In,Ga)As, and combinations thereof. Exemplary Group III-V quaternary alloys include (Ga,In)(As,P), (In,Al, Ga)Sb, and the like. Exemplary Group III-nitride alloys include (Ga,Al)N, (Ga,In)N, (Al,In)N, (Ga,Al,In)N, and combinations thereof. Quaternary alloys of the above may also be employed.

The substrate also can include a supplemental element such as C, H, N, Li, Na, K, Mg, Ca, Sr, Ba, Bi, B, Al, P, S, O, and the like in an amount typically less than an amount of the semiconductor. In an embodiment, the substrate includes silicon, and the silicon is optionally doped. According to an embodiment, the semiconductor is an intrinsic semiconductor or an extrinsic semiconductor doped with a selected dopant, e.g., a p-dopant or an n-dopant. In one embodiment, the substrate includes a p-dopant. In another embodiment, the substrate includes an n-dopant. In a particular embodiment, the substrate is p-doped Si. In one embodiment, the substrate is n-doped Si. The substrate can be produced from, e.g., commercially available semiconductor grade p-doped Si having a particular crystalline orientation, e.g., having Miller indices <111>, <100>, and the like. The substrate can be amorphous, polycrystalline, or a single crystal. In an embodiment, the substrate has a stacked structure that includes a plurality of semiconductor layers such as by forming films as SiGe/Si/SiGe/Si on the Si substrate. In some embodiments, the substrate includes crystalline domains among amorphous material. In another embodiment, the substrate is made of glass, Silicon dioxide, Pyrex, or sapphire.

In some embodiments, layer 38 is disposed on substrate 32 (see, e.g., FIG. 10). Layer 38 can isolate substrate 32 from electrode 6 or an environment external to substrate 32. According to an embodiment, layer 38 is electrically conductive. In certain embodiments, layer 38 is electrically isolating. In a particular embodiment, a plurality of layers 38 is disposed on substrate 32 of cantilever 2.

Layer 38 can include an oxide of an element in substrate 32 or independently can be an oxide of a semiconductor material such as $SiO_2$. According to an embodiment, first layer 60 is an oxide such as an oxide that includes an element from substrate 4, e.g., an oxide of the semiconductor (also referred to herein as a semiconductor oxide). In an embodiment, substrate 32 includes Si, and layer 38 includes silicon dioxide ($SiO_2$). Other layer 38 materials include gallium oxide ($GaO_3$), aluminum oxide ($Al_2O_3$), or alloys thereof, oxides of compounds from Groups III and V or alloys thereof, and the like. Exemplary oxides in layer 38 also include ZnO, $HfO_2$, $SnO_2$, $In_2O_3$, $Zn_2SnO_4$, $Ga_2O_3$, $Al_2O_3$, and the like. In an embodiment, layer 38 is a product of oxidation of a portion of substrate 32 to produce the semiconductor oxide. According to one embodiment, the oxide is a product of rapid thermal oxidation (RTO) of substrate 32 so that the oxide (layer 38) is derived from substrate 32. In another embodiment, the oxide is a product of low temperature oxidation (LTO) of substrate 32 to produce an oxide. In a further embodiment, the oxide is a product of depositing the oxide on substrate 32, which may or may not involve oxidation of substrate 32. In a certain embodiment, layer 38 includes $SiO_2$ as the oxide, which is a product of oxidation of substrate 32 that includes Si. In some embodiments, layer 38 includes a semiconductor oxide, a ceramic (e.g., $ZrO_2$, $Al_2O_3$, SiC, $Si_3N_4$, BN, $BaTiO_3$, and the like), a glass, or a combination comprising at least one of foregoing.

In an embodiment, layer 38 includes metal such that when a potential is applied to electrode 6, cantilever 2 is displaced due to electrostatic repulsion or electrostatic attraction with electrode 6. Accordingly, layer 38 includes, e.g., an electrically conductive material. Exemplary electrically conductive materials include a transition metal, alkaline earth metal, alkali metal, rare earth metal, metal carbide, metal oxide, metal sulfide, electrically conductive non-metals (e.g., graphene, carbon nanotubes, carbon black, and the like), or a combination thereof. Exemplary metals include Zr, Hf, Ti, V, Cr, Mn, Fe, Co, Ni, Cu, Zn, Nb, Mo, Tc, Ru, Rh, Pd, Ag, Cd, Ta, W, Re, Os, Ir, Pt, Au, Li, Na, K, Be, Mg, Ca, Sr, Ba, Gd, and the like.

Tip 40 can be electrically conducting or electrically insulating and include a same or different material than substrate 32 or layer 38. In an embodiment, tip 40 is a same material as substrate 32.

In certain embodiments, a functional group is disposed on cantilever 2. According to an embodiment, the functional group is disposed on a surface of cantilever 2 opposing electrode 6. In one embodiment, the functional group is disposed on a surface of cantilever 2 facing electrode 6. The functional group can be disposed on a portion of cantilever 2 or disposed over an entire surface of cantilever 2. According to an embodiment, the functional group is disposed on tip 40. Exemplary functional groups include an atom, molecule, composition, and the like. The functional group can be magnetic, electrically conductive or insulating, and the like and can be any material that interacts with a sample to achieve displacement of cantilever 2 by virtue of interaction of the functional group with the sample. Exemplary functional groups include a ferromagnetic material, paramagnetic material, biological material (e.g., DNA, an antibody, amino acid, peptide, polypeptide, protein, glycoprotein, lipoprotein, antibody, nucleoside, nucleotide, oligonucleotide, nucleic acid, sugar, carbohydrate, oligosaccharide, polysaccharide, fatty acid, lipid, hormone, metabolite, growth factor, cytokine, chemokine, receptor, neurotransmitter, antigen, allergen, antibody, substrate, metabolite, cofactor, inhibitor, drug, pharmaceutical, nutrient, prion, biohazardous agent, infectious agent, prion, vitamin, carcinogen, mutagen, and the like), chemical functional group (e.g., an alkane, thiol, alcohol, silane, alkene, carboxylate, ether, ester, amine, imine, aldehyde, ketone, alkyne, aromatic, heterocyclic aromatic, catalysts, ligands, and the like), and the like.

In an embodiment, cantilever 2 is made of any material that can effectively be processed (e.g., micromachined, including lithography and the like) to form cantilever 2. Exemplary materials include Si, doped Si, SiN, Pt, SiC, diamond, and the like. In an embodiment, tip 40 is made of a material that can be disposed on cantilever 2. According to an embodiment, cantilever 2 includes layer 38 to increase an optical reflectivity of cantilever 2, e.g., Al, Au, and the like. In some embodiments, layer 38 provides an electrically conducting path from tip 40 to cantilever base 20. In another embodiment, layer 38 is a mechanically wear-resistant coating. In one embodiment, layer 38 provides strain to control a curvature of cantilever 2. According to an embodiment, layer 38 includes Cr, Au, Pt, PtIr, WC, TiN, doped diamond, diamond, diamond-like carbon (e.g., tetrahedral amorphous carbon), and the like.

Electrode 6 includes an electrically conductive material. Exemplary conductive materials include a metal such as a transition metal, alkaline earth metal, alkali metal, rare earth metal, metal carbide, metal oxide, metal sulfide, or a combination thereof. Exemplary metals include Zr, Hf, Ti, V, Cr, Mn, Fe, Co, Ni, Cu, Zn, Nb, Mo, Tc, Ru, Rh, Pd, Ag, Cd, Ta, W, Re, Os, Ir, Pt, Au, Li, Na, K, Be, Mg, Ca, Sr, Ba, Gd, and the like. In some embodiments, electrode 6 includes a plurality of electrodes.

In an embodiment, the electrodes contain a semiconductor. An exemplary semiconductor is an element from group 11, 12, 13, 14, 15, or 16 of the periodic table such as a Si, Ga, Ge, As, In, Sn, Sb, Te, At, Hf, Zn, and the like, or a combination thereof. Electrode array 2 also can include a supplemental element such as C, H, N, Li, Na, K, Mg, Ca, Sr, Ba, Bi, B, Al, P, S, O, and the like in an amount typically less than an amount of metal or semiconductor. In an embodiment, electrode 6 includes a material that is electrically conducting and optically transparent at a wavelength of light 42. Exemplary materials include indium tin oxide, aluminum zinc oxide, graphene, carbon nanotubes, and the like.

In some embodiments, electrode 6 includes a plurality of electrodes that have spacer 48 interposed between adjacent electrodes. Spacer 48 can be in insulating material such as a metal oxide, polymer, glass, ceramic, and the like. Spacer 48 prevents adjacent electrodes from contacting each other. In a particular embodiment, primary surface 122 of electrode 6 opposing cantilever 2 is coated with a material that prevents electrical contact between cantilever 2 and electrode 6.

The probe module can be made in various ways. Various components of the probe module can be made in a different or same fashion. The cantilever can be made, e.g., using a microfabrication or nanofabrication process used for making an article from a semiconductor such as silicon. Cantilevers are commercially available with or without a tip or layer. In an embodiment, a process for preparing the probe module includes providing a cantilever disposed on a cantilever base, disposing the cantilever base on a basal member, and attaching the basal member and cantilever base to a mount with a secondary fastener, tertiary fastener, or combination thereof. An electrode is disposed opposing cantilever at a primary distance and attached to the amount with a primary fastener to provide the probe module.

The cantilever may have a variety of shapes including polygonal, frustoconical, cuboidal, triangular, V-shaped, D-shaped, and the like. A length L of the cantilever can be greater than or equal to a width W of the cantilever. The width W can be greater than or equal to a thickness of the cantilever. The length L of the cantilever can be from 1 micrometer (μm) to 1 mm, specifically from 100 μm to 500 μm. The width W of the cantilever can be from 1 μm to 500 μm, specifically from 20 μm to 60 μm. The thickness of the cantilever can be from 100 nm to 10 μm, specifically from 500 nm to 2 μm.

In various embodiments, the cantilever is present in an environment that includes a fluid (e.g., gas or liquid), solid, or recommendation thereof. The probe module operates at a temperature from 0 Kelvin (K) to a maximum temperature permitted by the materials of components of the probe module, specifically from 0 K to 500 K, and more specifically from 0K to 400 K.

The tip of the cantilever can have a variety of shapes, including tetrahedral, rectangular pyramidal, conical, spherical, and cylindrical.

In an embodiment, the cantilever has an apex at, e.g., the tip such that the cantilever interacts with a sample at the apex. The cantilever can exhibit flexural bending or torsional bending in response to a force at the apex of the tip. Moreover, the cantilever may exhibit a mechanical eigenmode in response to a time varying force.

In various embodiments, a size of the electrode or a shape of the electrode can be selected according to a type of cantilever. Additionally, the electrode can be selected based on a type of sensor to detect motion (e.g., an exhibited eigenmode) of the cantilever. According to an embodiment, the size of the electrode along a direction of a long axis of the cantilever is smaller than length L of the cantilever to accommodate light to reflect from the cantilever. In an embodiment, the electrode is optically transparent to a wavelength of the light and has a size that corresponds to an entire opposing surface of the cantilever. In certain embodiments, primary surface (e.g., primary surface 122 as shown in FIG. 17) of the electrode proximate to the cantilever is shaped such that the primary surface is parallel to an opposing surface of the cantilever for maximal overlap of the primary service electrode and the cantilever. In an embodiment, the electrode does not extend beyond a periphery of the cantilever to prevent the electrode from physically contacting a sample disposed proximate to the cantilever.

A strength of an electrostatic force between the electrode and the cantilever can be controlled by selectively applying a voltage or a charge on the cantilever and electrode. Without wishing to be bound by theory, it is believed that the strength of the electrostatic force depends on a size of the primary distance D between the electrode and the cantilever. In an embodiment, the primary distance D is from 10 nanometers (nm) to 1 mm, specifically from 1 μm to 100 μm, and more specifically from 5 μm to 25 μm. primary distance D can be selected to provide a tailorable electrostatic force on the cantilever or to minimize an undesired change in a behavior of the cantilever, e.g., mechanical damping.

Figure 24:
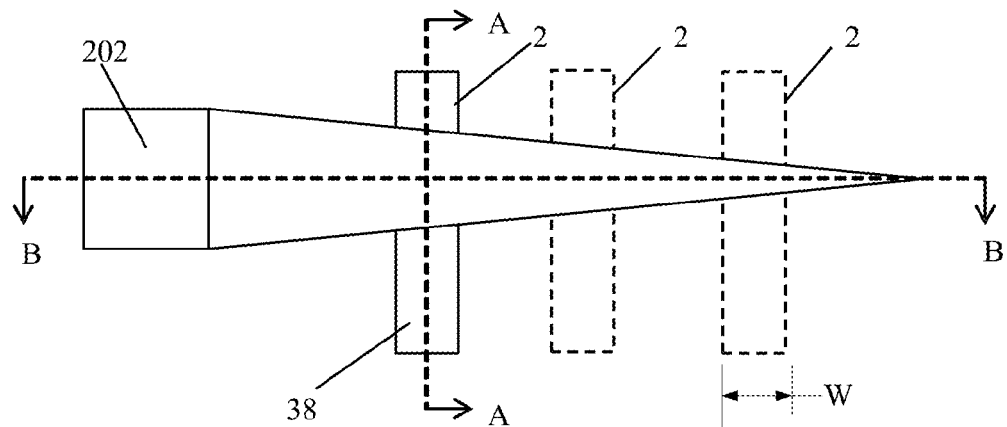
FIG. 24 shows a top view of a portion of a probe module.
Figure 25:
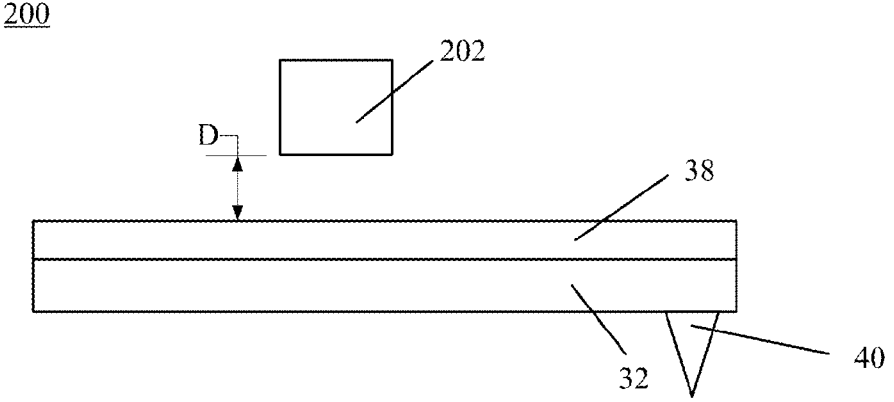
FIG. 25 shows a longitudinal cross-section along line A-A shown in FIG. 24.
Figure 26:
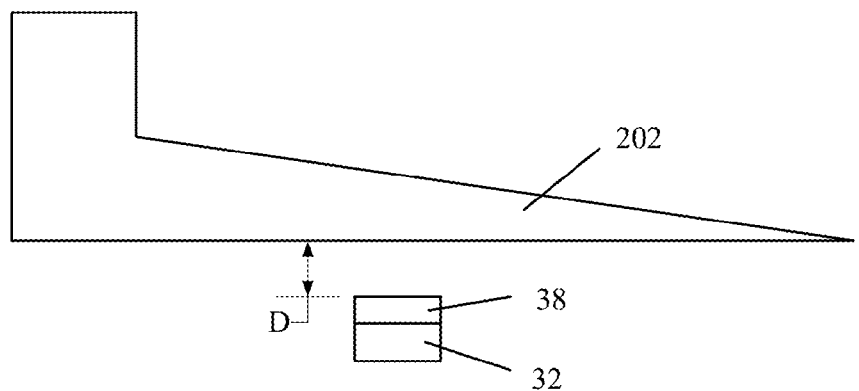
FIG. 26 shows a longitudinal cross-section along line B-B shown in FIG. 24.

According to the embodiment shown in FIG. 24 (top view of a portion of module 200), FIG. 25 (cross-section along line A-A of FIG. 24), and FIG. 26 (cross-section along line B-B of FIG. 24), electrode 202 has a shape such that electrode 202 overlaps width W of cantilever. Accordingly, electrode 202 can be along the direction of width W or length L. A position of cantilever 2 in various alternative positions with respect to electrode 202 is indicated by dotted lines for cantilever 2. Without wishing to be bound by theory, it is believed that for a fundamental flexural eigenmode of cantilever 2, the strength of the electrostatic force between electrode 202 and cantilever 2 scales with an overlap of electrode 200 and cantilever and 2. For this mode, changing an overlap controls the strength of the electrostatic interaction between electrode 202 and cantilever 2. For a flexural eigenmode greater than the fundamental eigenmode, an optimal overlap between cantilever 2 and electrode 202 is a half-wavelength of such eigenmode. According to an embodiment, this geometrical configuration for electrode 202 and cantilever 2 provides optimization of the electrostatic force for flexural eigenmodes of cantilever 2. According to an embodiment, electrode 202 is positioned proximate to cantilever 2 such that a displacement sensor (e.g., see displacement sensor 182 shown in FIG. 22 or 23) is disposed at a location along length L of cantilever 2. Disposing electrode 202 proximate to a fixed end (e.g., first end 34) of cantilever 2 provides disposition of light 42 at a free end (e.g., second end 36) of cantilever 2, where a sensitivity of a displacement sensor or an optical sensor is highest. In an embodiment, disposing electrode 202 proximate to the free end of cantilever 2 results in a greater displacement per unit of electrostatic force of cantilever 2 since a rigidity or stiffness of cantilever 2 scales with a cube of length L, i.e., $L^3$.

Additionally, the probe module is scalable in size and can have a variety of dimensions or sizes formed, e.g., by microfabrication, nanofabrication, or bulk size (e.g., on a centimeter scale) processing. Although tip 40 has been shown as being disposed on a surface of cantilever 2 that faces away from the electrode, tip 40 can be disposed on a surface of cantilever 2 opposing the electrode. Further, in an embodiment, instead of projecting in a direction orthogonal to a plane defined by cantilever 2, tip 40 can project in the plane of cantilever 2. Tip 40 can have a length from 1 nm to 250 µm, specifically from 5 µm to 25 µm. Tip 40 can have an apex that is on the order of a few angstroms to 1 mm, specifically from a few angstroms to 50 nm.

In an embodiment, the primary distance D between the cantilever and the electrode can be from a few nanometers to millimeters, e.g., 10 nm to 1 mm. Moreover, the probe module can include a large range of motion or vibrational oscillation of the cantilever. The cantilever can be displaced in space up to any distance such that the cantilever can return to an equilibrium position without permanent deformation. In some embodiments, the cantilever can be displaced from 0 nm to 1 mm, specifically from 0 nm to 25 µm. Moreover, the cantilever can be subjected to modulation over a broad range of frequencies from, e.g., 0 Hz to 100 GHz.

The probe module has advantageous properties, including having a microscale mechanical transducer and having a geometry for atomic force microscope (AFM) scanning (or other types of devices for acquiring data from a surface of sample or an interface) with an integrated optical sensing of displacement due to a condition of a sample. Additionally, the probe module provides detection of displacement of that cantilever in response to mechanical excitation. As such, the probe module has a high bandwidth and high sensitivity near a quantum limit in a small size scanning configuration that can be economically made using, e.g., bulk size manufacturing, microelectromechanical system (MEMS) fabrication techniques, or a combination thereof. Integrating optomechanical transduction of the cantilever in the probe module provides high precision or stability. The probe module has a sensitivity, e.g., greater than $10^{-10}$ m/Hz$^{1/2}$, specifically greater than $10^{-12}$ m/Hz$^{1/2}$, more specifically greater than $10^{-14}$ m/Hz$^{1/2}$, further more specifically greater $10^{-16}$ m/Hz$^{1/2}$.

In some embodiments, the electrode provides an electrostatic force to be imparted to the cantilever for flexural displacement of the cantilever. Independent electrical connections are provided to the electrode and the cantilever (e.g., to the layer disposed on the substrate of the cantilever). First voltage V1 and second voltage V2 are independently a constant voltage or a time varying voltage. Accordingly, the resulting electrostatic force between the cantilever and the electrode is, respectively, constant or time varying.

According to an embodiment, as shown in FIG. 10, a plurality of electrodes disposedly arranged along length L of the cantilever provides selective excitation of a flexural mechanical eigenmode of the cantilever. According to an embodiment, first electrode 50 and second electrode 52 are independently subjected to an alternate current (AC) voltage, direct current (DC) voltage, or a combination thereof for displacement control of the cantilever, i.e., controlling the size of primary distance D. In an embodiment, as shown in FIG. 11, first electrode 50 and second electrode 52 are offset from a central axis of the cantilever for torsional excitation of the cantilever, i.e., to subject the cantilever to exhibit a torsional eigenmode. According to a certain embodiment, as shown in FIG. 10, an independent electrical connection is provided to each electrode of a plurality of electrodes, e.g., in an array of electrodes, or to cantilever (e.g., the substrate, the layer, or a combination thereof). Voltages V1, V2, and V3 can be constant or varying in time to provide a constant or time-dependent electrostatic force applied to the cantilever by the electrode. Additionally, the voltage or charge on each electrode can be varied independently.

According to an embodiment, e.g., as shown in FIG. 13, a plurality of electrodes 54 are arranged in an array, e.g., an addressable array, to subject cantilever 2 to excitation of a flexural eigenmode, torsional eigenmode, or a combination thereof.

In certain embodiments, application of a voltage or charge to the electrode or cantilever can be subjected to electrical conditioning by including a circuit element in a series or parallel electrical connection with a power source, cantilever, electrode, or a combination thereof. Exemplary circuit elements include a capacitor (e.g., disposed between the power source and the electrode or cantilever) to provides DC isolation, a resistor to limit current flow, an inverter to invert a polarity of charge on the electrode or cantilever.

The probe module is sensitive to a condition of a sample probed by the cantilever. Exemplary conditions include electron density, surface corrugation, surface stiffness, electrical conductivity, magnetic force, topography, atomic arrangement, surface defect, mechanical contact force, van der Waals force, capillary force, chemical bonding, electrostatic force, Casimir force, solvation force, and the like. A construction and arrangement of the probe module can be varied and adapted for various geometries and uses.

The probe module also allows for efficient acquisition of the surface condition. In an embodiment, a process for acquiring a condition of a sample includes providing the probe module, disposing the probe module in an instrument, disposing the probe module proximate to a sample, adjusting a primary distance between the cantilever and the electrode. The process further includes probing a sample with the cantilever, displacing the cantilever from the primary distance in response to a condition of the sample, communicating displacement of the cantilever to a displacement sensor, and detecting (by the displacement sensor) a displacement of the cantilever to acquire the condition of the sample. Additionally, the process includes applying a stimulus to the electrode disposed proximate to the cantilever and changing a mechanical property of the cantilever in response to applying the stimulus; displacing the cantilever in response to interaction with the sample; and detecting (by the displacement sensor) a displacement of the cantilever to acquire the condition of the sample. The condition includes, e.g., an electron density, surface corrugation, surface stiffness, electrical conductivity, magnetic force, topography, atomic arrangement, surface defect, mechanical contact force, van der Waals force, capillary force, chemical bonding, electrostatic force, Casimir force, solvation force, or a combination thereof.

It is contemplated that the cantilever is configured to be displaced from the primary position in response to an electrostatic interaction with the electrode. According to an embodiment, the primary fastener is configured to mechanically adjust the primary distance between the cantilever and the electrode. In some embodiments, the electrode is detachably disposed on the mount. The probe is configured to interact with a sample in an atomic force mode in certain embodiments. In one embodiment, the primary fastener is configured to provide a voltage, a charge, or combination comprising one of the foregoing to the electrode. The secondary fastener can be configured to provide a voltage, a charge, or a combination comprising at least one of the foregoing to the cantilever. In an embodiment, the first electrode is configured to receive a first voltage, a first charge, or combination comprising at least one of the foregoing; and the second electrode is configured to receive a second voltage, a second charge, or a combination comprising at least one of the foregoing. According to an embodiment, the cantilever is configured to be displaced in a flexural mode, a torsional mode, or a combination comprising at least one of the foregoing in response to an electrostatic interaction with the electrode.

Figure 27:
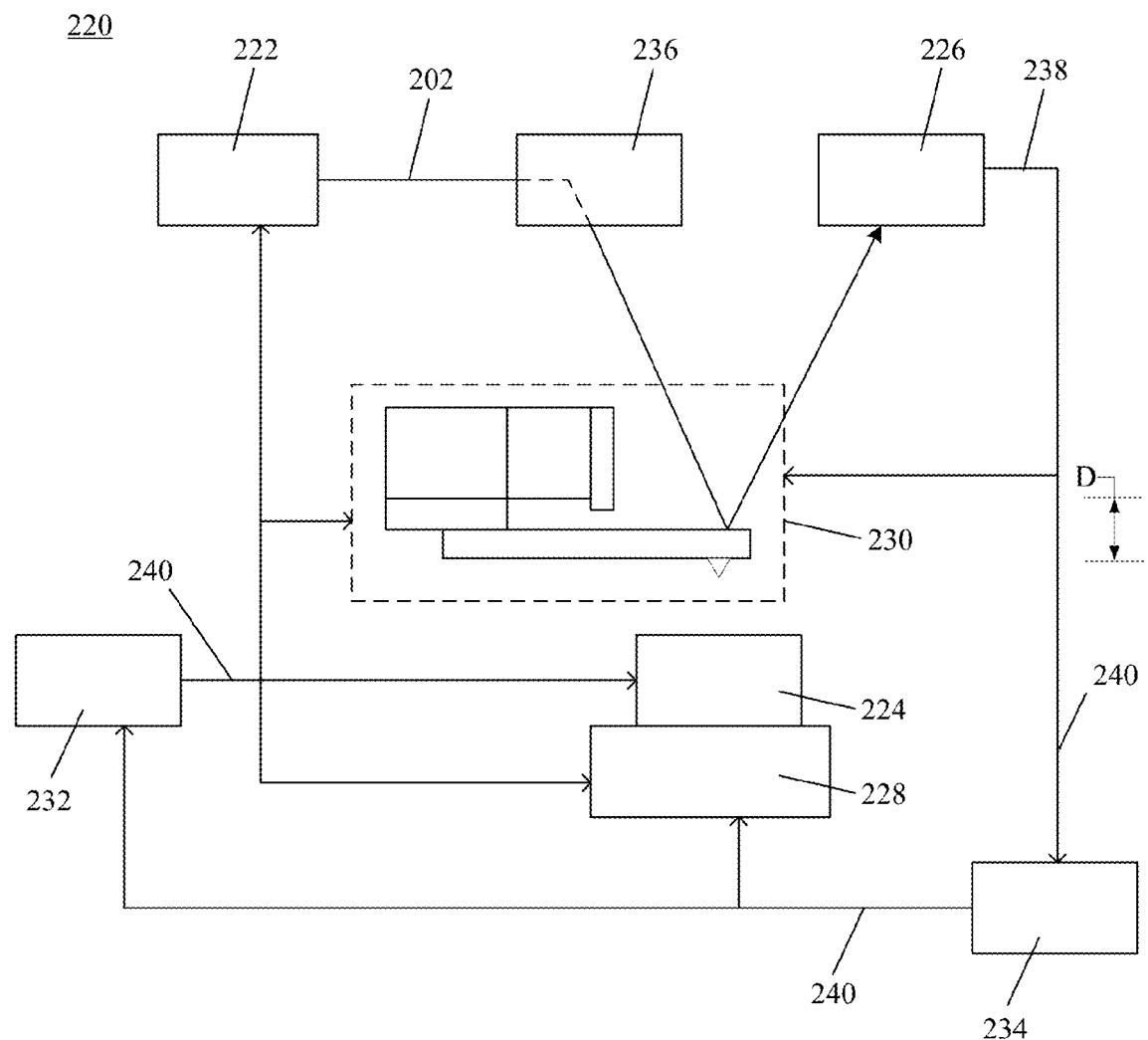
FIG. 27 shows a probe module system.

In an embodiment, with reference to FIG. 27, probe module system 220 includes light source 222 (e.g., a laser, diode, lamp, bulb, super-luminescent diode, and the like) to provide light 42. Mirror 236 is optionally disposed along a path of propagation of light 42 to control a position of light 42 onto cantilever 2 or to control a position of light 42 reflected from cantilever 2 onto detector 226. Detector 226 can be a photodiode (e.g., a bi-cell photodiode, quadrant photodiode, and the like), a position sensitive detector, a photomultiplier, and the like. Sample 224 is optionally disposed proximate to tip 40 of cantilever 2. Positioner 228 on which sample 224 is disposed optionally includes a positioning member (e.g., a micrometer, motorized stage, piezoelectric tube transducer, flexure scanner, and the like) to position sample 224 with respect to cantilever 2 or probe module 230. A controller 232 or microprocessor 234 (e.g., computer) also is included in probe module system 220. In an embodiment, controller 232 includes a power source (to supply voltage or charge), feedback loop, function generator, phase sensitive detector (e.g., a lock-in amplifier), analog-to-digital converter, digital-to-analog converter, and the like, or combination thereof. Controller 232 or microprocessor 234 is configured to receive a signal 238 from detector 226. Signal 238 can include data for a flexural or torsional displacement of cantilever 2. Controller 232 is configured to operate a feedback loop (e.g., controlling a distance between sample 224 and cantilever 2). Controller 232 optionally is configured to apply a voltage or charge to electrode 6, cantilever 2 (such as substrate, layer, or combination thereof), and the like. Such voltages can be part of a feedback loop, e.g., a positive feedback loop or a negative feedback loop. Controller 232 also can control a positioner 228 to control a position of sample 224 relative to cantilever 2, control position of electrode 6, scanning of sample 224 by probe module 220. Such positioning can be in one-, two-, or three-dimensions. Alternatively, positioning of sample 224, electrode 6, or cantilever 2 can be performed manually. Microprocessor 234 can be connected to a display (not shown) to display required data. Additionally, microprocessor 234 can include a storage medium to store data, parameters for operating probe module system 220, and the like. Microprocessor 234 or controller 232 is configured to receive various input, e.g., from an external source, a user, and the like. Although communication lines 240 between components in probe module system 220 and controller 232 or microprocessor 234 are shown as lines with a single-headed arrow, it is contemplated that communication is one-way, two-way, or a combination thereof.

In some embodiments, probe module system 220 includes a position measurement device to determine relative location locations, e.g., of cantilever 2, electrode 6, positioner 228, and the like.

Controlling application of a charge or voltage on cantilever 2 or electrode 6 produces an attractive or repulsive force therebetween such that cantilever 2 is displaced relative to electrode 6. It is contemplated that changing the charge or voltage in time (e.g., in a feedback loop) produces a deflection response that is considered to be a variation of an effective spring constant of cantilever 2 without a physical modification of cantilever 2. Electrode 6 subjects cantilever 2 to a temporally changing electrostatic force that counteracts or augments an interaction between tip 40 and a surface of sample 224. According to an embodiment, the electrostatic force excites cantilever 2 at a selected frequency.

A voltage selected to deflect cantilever 2 is applied, e.g., by controller 232. As the charge applied to cantilever 2 and other components is controlled, the voltage to displace cantilever 2 is determined by, e.g., an effective capacitance $C_{eq}$ of probe module 230 and sample 224. Primary distance D is from 10 nm to 100 μm, specifically from 5 μm to 25 μm. The displacement from primary distance D can be from 0 nm to 100 μm, specifically from 0 nm to 5 μm. In some embodiments, $C_{eq}$ is selected to provide charge sufficient to deflect cantilever 2. Accordingly, $C_{eq}$ can be less than or equal to 100 microfarads (μf), specifically from 100 attofarads (af) to 10 picofarads (pf). It is contemplated that a voltage applied to electrode 6 relative to cantilever 2 is selected to selectively deflect cantilever 2. Accordingly, the voltage applied to electrode 6 relative to cantilever 2 can have a magnitude of several volts (V), e.g., from 0 V to 1 kilovolts (kV), specifically from 0 V to 100 V, and more specifically from 0 V to 10 V. In an embodiment, a force subjected to cantilever 2 by a applying a voltage or charge to electrode 6 can be, e.g., greater than or equal to 100 nano Newtons (nN). Considerations of electric field, surface charge density of various elements of probe module 220, force on cantilever 2, and the like are discussed in Long et al., "Modular Apparatus for Electrostatic Actuation of Common Atomic Force Microscope Cantilevers," Review Scientific Instruments, (2014), the disclosure of which is incorporated herein by reference in its entirety.

In an embodiment, a process for operating a probe module system includes disposing a cantilever on a mount, aligning (with a primary faster) an electrode disposed on the mount with the cantilever, providing optical access to a light at an end of the cantilever, disposing a probe module in an apparatus (e.g., an atomic force microscope, a scanning microscope, and the like), aligning the light such that the light reflects from the end of the cantilever, receiving (by a detector) light reflected from the cantilever, adjusting a relative electrical potential of the cantilever and the electrode, and applying a constant or temporarily changing electrostatic force between the electrode and the cantilever to operate the probe module system.

According to an embodiment, for a cantilever that is electrically insulating, an electrical charge is applied (e.g., using a scanning electron microscope) to the cantilever before or after disposing the cantilever into the probe module. The electrode is connected to a power source (e.g., controller 232), and a potential of the cantilever can float such that voltage is applied to electrode without direct application of a voltage to the cantilever from a power source. In a certain embodiment, the cantilever is electrically insulating and contains no net charge such that the cantilever is adjusted to the force from the electrode by a dielectrophoretic force from an electric field gradient that originates from voltage or charge on the electrode. In one embodiment, an electric field gradient is produced by having a geometrically sharp point proximate to the cantilever or by disposing a plurality of electrodes (with some electrodes at different potentials) proximate to the cantilever.

The probe module has a number of beneficial advantages. The probe module provides application of forces directly to a cantilever to selectively control displacement of the cantilever and to selectively excite a resonant mechanical eigenmode of the cantilever. Subjecting the cantilever to the force avoids displacement or resonant excitation of other structures (e.g., other components of the probe module, an instrument in which the probe module is disposed, and the like). Accordingly, the cantilever is accurately positioned relative to a sample. Further, the probe module is compatible with many commercially available instruments or cantilever displacement sensors such as optical-levers, interferometers, capacitive sensors, and the like. Additionally, the probe module can be produced with commercially available components. It is contemplated that the probe module can have a monolithic structure. It is particularly contemplated that the probe module is not a monolithic structure such that the cantilever, the electrode, or a combination thereof is detachably disposed on the mount of the probe module. Such detachable disposition of the cantilever, the electrode, or a combination thereof provides rapid interchangeability or replacement of the cantilever, the electrode, or a combination thereof.

The probe module and processes herein are further illustrated by the following examples, which are non-limiting.

EXAMPLES

Example 1

Probe Module System Operation

Figure 28:
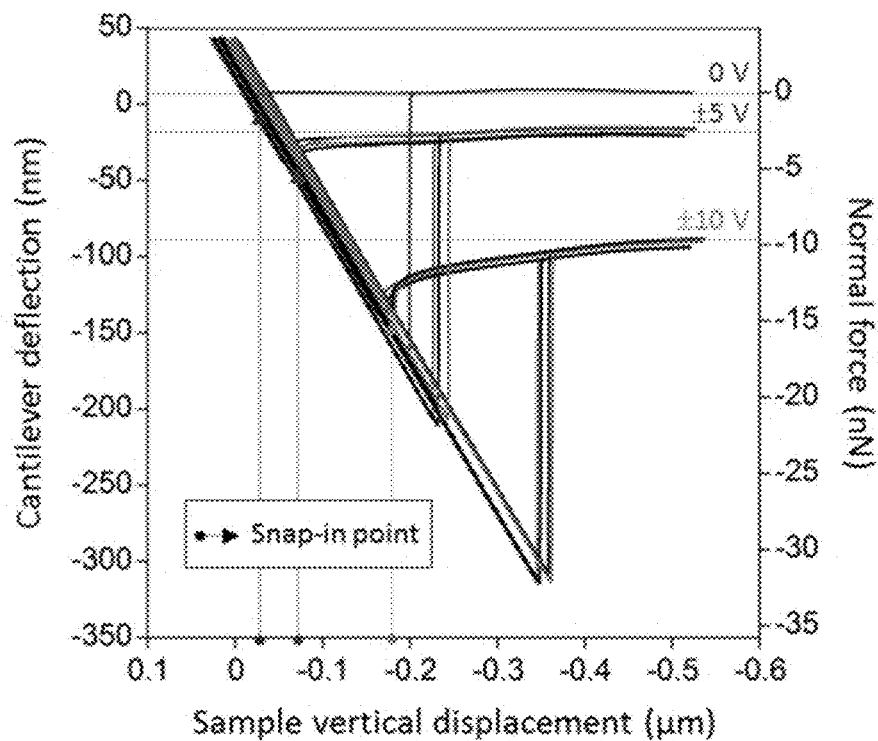
FIGS. 28 and 29 show graphs of cantilever deflection and normal force versus simple vertical displacement according to Example 1.

The probe module system was made and operated. The probe module system included a cantilever base and cantilever from a commercial source (model PPP-LFMR, available from NanoWorld AG, Neuchatel, Switzerland). The probe module was disposed in an atomic force microscope (model Cypher, commercially available from Asylum Research, an Oxford Instruments company, Santa Barbara, Calif.). Data was acquired for the collection of the cantilever displacement and net normal force applied to the cantilever from the electrode and the sample. Here, the cantilever was deflected from the sample at five different applied voltages (−10 V, −5 V, 0 V, +5 V, and +10 V), where the voltages were applied to the cantilever and the electrode. Force as a function of displacement of the sample (relative to the cantilever base) was determined by moving the sample to approach the tip of the cantilever until contact was made, and the tip was pressed into the sample up to a maximum applied load. The tip was then retracted away from the sample until the tip-sample contact was broken. FIG. 28 shows a graph of cantilever deflection and normal force applied to the cantilever versus sample vertical displacement for the applied voltages, which provided three families of curves, each corresponding to a magnitude of the applied voltage. The magnitude of the applied voltage determined a deflection (or normal force offset) and "snap-in" position where the tip made first contact with the surface. The data shown in FIG. 28 demonstrates that the electrostatic forces carried approximately with a square of the applied voltage.

Figure 29:
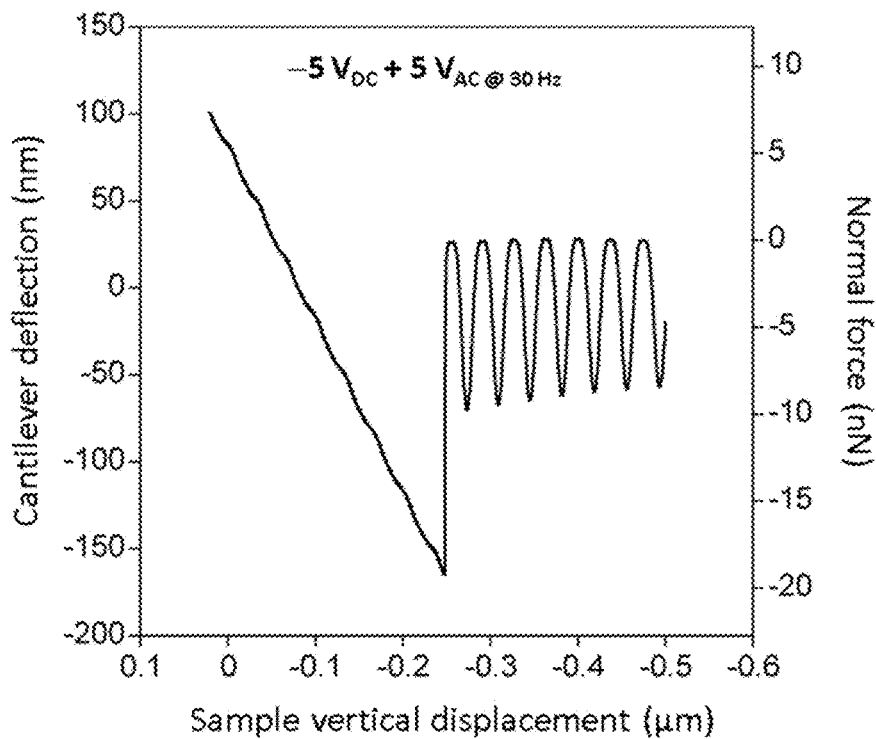

In order to demonstrate a time-varying repulsive electrostatic force between the electrode and the cantilever, a voltage with a time-invariant component of −5 V plus a sinusoidal oscillatory component of 5 V amplitude, 30 Hz frequency was applied to both the cantilever and the electrode. Data was acquired for the collection of the cantilever displacement and net normal force applied to the cantilever from the electrode and the sample. FIG. 29 shows a graph of cantilever deflection and normal force applied to the cantilever as a function of sample vertical displacement as the sample is withdrawn from the tip and the contact between the tip and the sample is broken. Thus, in addition to applying a constant force, or deflection offset, the probe module provided an oscillatory or temporarily changing force. It is contemplated such a force is included in a feedback loop.

Example 2

Probe Module Frequency Response

Figure 30:
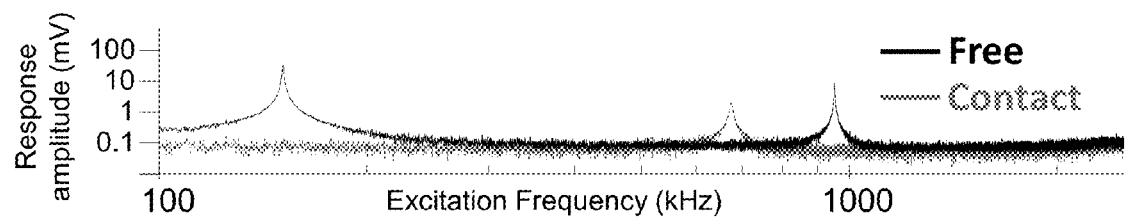
FIG. 30 shows a graph of response amplitude versus excitation frequency according to Example 2.

The probe module system of Example 1 was used to determine a frequency dependent response amplitude for the cantilever of the probe module. Here, the cantilever base and the cantilever were from a commercial source (model DCP 11, available commercially from NT-MDT, Moscow, Russia). The cantilever was operated in a free mode and a contact mode. In free mode operation, the tip of the cantilever was located 500 nm above the surface of a sample. In contact mode operation, the tip of the cantilever was pressed into the sample such that the normal force on the cantilever tip was approximately 400 nN. The cantilever was subjected to an excitation frequency from the electrode, and the response amplitude of the cantilever to the excitation frequency was measured as a function of the excitation frequency. FIG. 30 shows a graph of the results of the measurement, i.e., a graph of response amplitude versus excitation frequency for free mode and contact mode. In free mode of operation of the cantilever, two resonances (150 kHz, 950 kHz) were observed having quality factors respectively of 150 and 310 and were attributed to the lowest two flexural modes of the cantilever. In contact mode of operation of the cantilever, a resonance at 650 kHz was observed having a quality factor of 10 and was attributed the lowest contact flexural mode of the cantilever. These data indicate that in contact mode operation, where the quality factor of the mechanical resonance of the cantilever was low compared to the free mode quality factor, the mechanical resonance was detected, and the frequency dependent response amplitude did not exhibit detectable spurious mechanical resonances.

Example 3

Comparative Frequency Response

Figure 31:
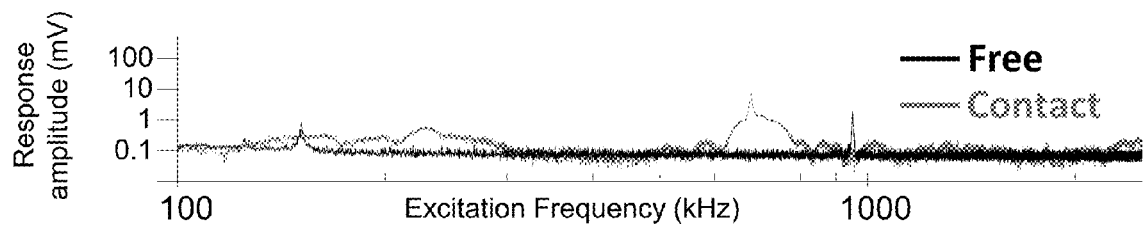
FIGS. 31 and 32 show graphs of response amplitude versus extinction frequency according to Example 3 and Example 4, respectively.

The probe module system of Example 1 was modified by removing the probe module from the atomic force microscope and disposing (in place of the probe module) a piezoelectrically driven probe module, which included a cantilever holder (Cypher standard holder, commercially available from Asylum Research, an Oxford Intruments company, Santa Barbara, Calif.) and a cantilever base and cantilever (model DCP 11, available commercially from NT-MDT, Moscow, Russia). Here, a piezoelectric member was disposed distal to a free end of the cantilever. Thus, an electrode was not present to provide the excitation frequency to the cantilever as in Example 2. Instead, an excitation frequency was supplied to the cantilever by the piezoelectric member, and a response amplitude to the excitation frequency of the cantilever was measured as a function of the excitation frequency. FIG. 31 shows a graph of the results of the measurement, i.e., a graph of response amplitude versus excitation frequency for free mode and contact mode for the piezoelectrically driven cantilever. In free mode of operation of the cantilever, three resonances (125 kHz, 150 kHz, and 950 kHz) were observed having a response amplitude respectively of 0.2 mV, 0.8 mV, and 1.8 mV. However, in contact mode of operation of the cantilever, a plurality of spurious resonances were observed in contrast to the single resonance peak at 650 kHz for the cantilever of Example 2 (see FIG. 30).

Example 4

Comparative Frequency Response

Figure 32:
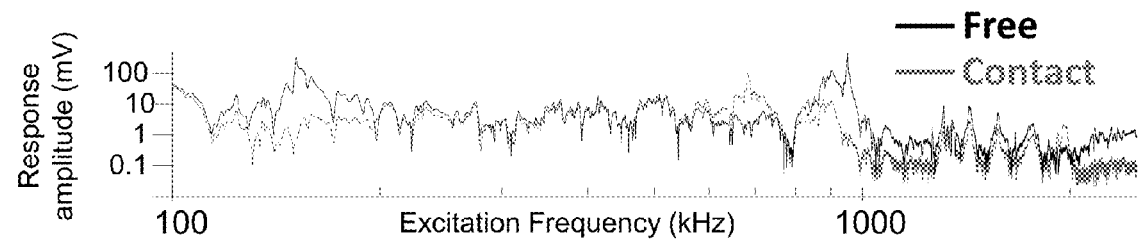

The probe module system of example 1 was modified by removing the probe module from the atomic force microscope and disposing (in place of the probe module) a piezoelectrically driven probe module having a cantilever holder (Cypher standard holder, commercially available from Asylum Research, an Oxford Instruments company, Santa Barbara, Calif.) and cantilever base and cantilever (model DCP 11, available commercially from NT-MDT, Moscow, Russia). Here, the cantilever holder contained a piezoelectric member disposed proximate to a fixed end of the cantilever (cf. Example 3 where the piezoelectric module was disposed distal to the free end of the cantilever). Thus, an electrode was not present to provide the excitation frequency to the cantilever as in Example 2. Instead, an excitation frequency was supplied to the cantilever by the piezoelectric member, and a response amplitude to the excitation frequency of the cantilever was measured as a function of the excitation frequency. FIG. 32 shows a graph of the results of the measurement, i.e., a graph of response amplitude versus excitation frequency for free mode and contact mode for the piezoelectrically driven cantilever. In free mode of operation of the cantilever, a plurality of resonances covering the complete extinction frequency space were observed. Similarly, in contact mode of operation of the cantilever, a plurality of spurious resonances were observed in contrast to the single narrow resonance peak at 650 kHz for the cantilever of Example 2 (see FIG. 30).

Data from Example 2 demonstrate that the probe module therein, in contrast to the cantilever in Examples 3 and 4, had a clean frequency response with a clearly discernible resonance peak due to electrostatic excitation by the electrode. The amplitude response of the cantilever to electrostatic excitation (FIG. 30) was devoid of the external resonances that were apparent when using piezoelectric excitation.

Example 5

Probe Module Topography Imaging

Figure 33:
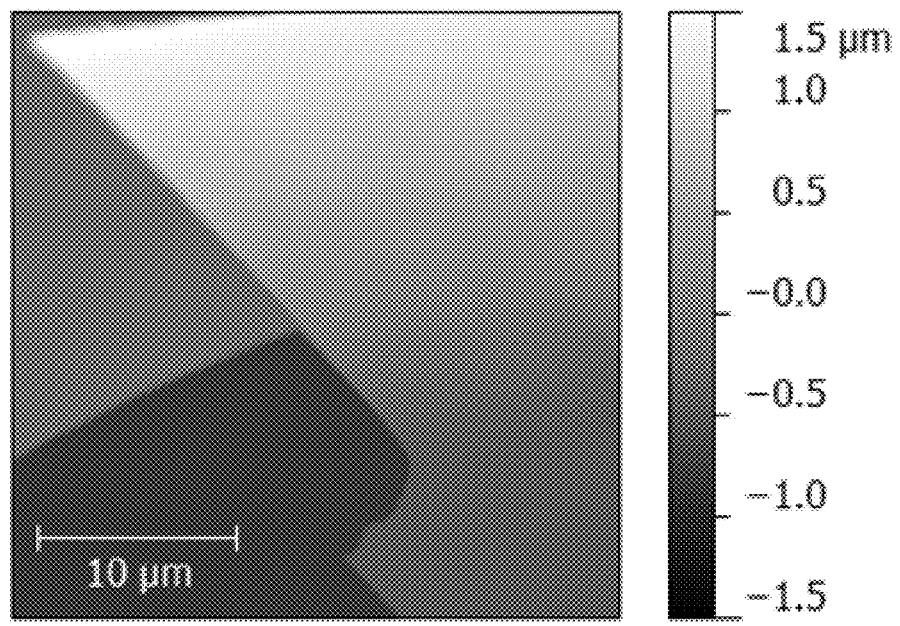
FIG. 33 shows a topographical image according to Example 5.

The probe module system of Example 1 was used to acquire a topographic image of a surface of a sample. The sample was a mica disc (model 50, available commercially from Ted Pella, Inc., Redding, Calif.) that was cleaved using sticky tape prior to imaging. The cantilever was subject to a force by a applying a DC voltage of 5 V and an AC voltage of 5 V amplitude to the electrode while the a voltage of 0 V was applied to the cantilever. For topographic imaging, the response amplitude of the cantilever was detected and used as an input for a feedback loop in order to maintain a constant tip-sample interaction during image acquisition. FIG. 33 shows a topographic image obtained by scanning the cantilever over the surface.

Example 6

Torsional Excitation of the Cantilever

Figure 34:
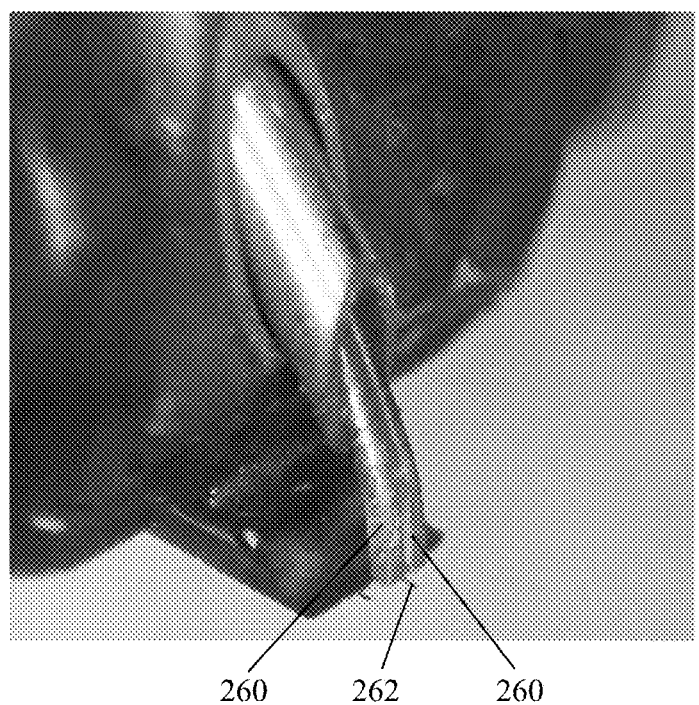
FIG. 34 shows a photograph of a portion of a probe module according to Example 6.
Figure 35:
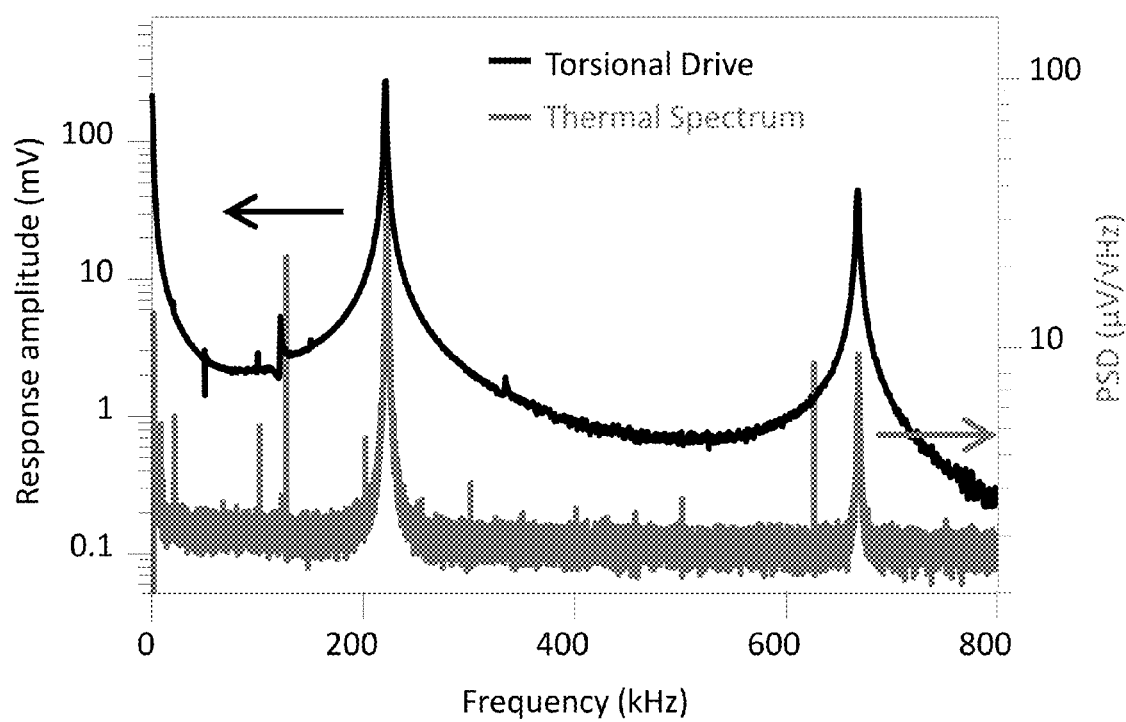
FIG. 35 shows a graph of response amplitude and PSD versus excitation frequency according to Example 6.

The probe module system of example 1 was modified to include two electrodes 260 disposed proximate to the cantilever 262 as shown in FIG. 34. The electrodes 260 provided torsional excitation of cantilever 262. Each electrode 260 was offset laterally from a long axis of cantilever 262. Here, the torsional mode of cantilever 262 two was excited by electrically grounding cantilever 262, applying a common DC bias to both electrodes 260, and applying an AC bias modulation to the DC bias such that the AC bias applied to electrodes 260 had a same frequency and amplitude and opposite polarity to provide the AC bias of each electrode 260 out-of-phase 180 degrees. A response amplitude of cantilever 262 as a function of excitation frequency by electrodes 260 was acquired. FIG. 35 shows a graph of response amplitude versus frequency for cantilever 262 under excitation of torsional eigenmodes of cantilever 262. FIG. 35 also shows data for a thermal spectrum collected at room temperature without excitation of torsional eigenmodes. The response amplitude measured was devoid of a spurious resonance, which was consistent with excitation of a flexural eigenmode in Example 1.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A probe module comprising:
a mount;
a cantilever disposed on the mount;

an electrode disposed on the mount and opposing the cantilever; and a primary fastener disposed on the mount to mechanically separate the cantilever and the electrode at a primary distance, wherein the cantilever is detachably disposed on the mount, or the electrode is detachably disposed on the mount.

2. The probe module of claim 1, further comprising a secondary fastener to detachably dispose the cantilever on the mount.

3. The probe module of claim 2, wherein the secondary fastener is configured to provide a voltage, or a charge to the cantilever.

4. The probe module of claim 1, wherein the cantilever comprises:

a first end proximate to the mount;

a second end distal to the mount; and a tip projecting from a surface of the cantilever, wherein the cantilever is configured to reflect a light beam as a displacement diagnostic.

5. The probe module of claim 4, wherein the cantilever further comprises:

a substrate; and a layer disposed on the substrate, wherein the layer is electrically conductive.

6. The probe module of claim 4, further comprising a cantilever base, wherein the cantilever base is interposed between secondary fastener and the mount such that the cantilever base and the cantilever are detachably disposed on the mount.

7. The probe module of claim 1, wherein the electrode comprises:

a first electrode; and a second electrode.

8. The probe module of claim 7, wherein the first electrode and the second electrode are disposed substantially longitudinally along a length of the cantilever.

9. The probe module of claim 7, wherein the first electrode and the second electrode are disposed substantially transversely along a width of the cantilever.

10. The probe module of claim 7, wherein the first electrode is configured to receive a first voltage, or a first charge; and the second electrode is configured to receive a second voltage, or a second charge.

11. The probe module of claim 1, wherein the electrode comprises a plurality of electrodes arranged in an array.

12. The probe module of claim 1, further comprising a displacement sensor disposed proximate to the cantilever.

13. The probe module of claim 1, wherein the cantilever comprises a dielectric material.

14. The probe module of claim 1, wherein the cantilever comprises an electrically conductive material.

15. The probe module of claim 1, wherein the cantilever is configured to be displaced from a primary position in response to an electrostatic interaction with the electrode.

16. The probe module of claim 1, wherein the primary fastener is configured to mechanically adjust the primary distance between the cantilever and the electrode.

17. The probe module of claim 1, wherein the electrode is detachably disposed on the mount.

18. The probe module of claim 1, wherein the probe module is configured to interact with a sample in an atomic force mode.

19. The probe module of claim 1, wherein the primary fastener is configured to provide a voltage or a charge to the electrode.

20. The probe module of claim 1, wherein the cantilever is configured to be displaced in a flexural mode, a torsional mode, or a combination comprising at least one of the foregoing in response to an electrostatic interaction with the electrode.

* * * * *

UNITED STATES PATENT AND TRADEMARK OFFICE
CERTIFICATE OF CORRECTION

| | |
|---|---|
| PATENT NO. | : 8,943,611 B2 |
| APPLICATION NO. | : 14/335515 |
| DATED | : January 27, 2015 |
| INVENTOR(S) | : Rachel Cannara and Christian Long |

Page 1 of 1

It is certified that error appears in the above-identified patent and that said Letters Patent is hereby corrected as shown below:

ON THE TITLE PAGE, item 73 should be corrected as follows:

"National Institute of Standards and Technology, Gaithersburg, MD (US)" should read
-- National Institute of Standards and Technology, Gaithersburg, MD (US);
   The University of Maryland, College Park, MD (US) --.

Signed and Sealed this
Twenty-fifth Day of August, 2015

Michelle K. Lee
*Director of the United States Patent and Trademark Office*